(12) United States Patent
Feke

(10) Patent No.: US 8,113,702 B2
(45) Date of Patent: Feb. 14, 2012

(54) VARIABLE CONDENSER FOR DELIVERY OF ILLUMINATION INCLUDING RECURSIVELY NESTED CIRCLE TO-LINE FIBER OPTIC CONVERTER CABLE

(75) Inventor: Gilbert Feke, Glastonbury, CT (US)

(73) Assignee: Carestream Health, Inc., Rochester, NY (US)

( * ) Notice: Subject to any disclaimer, the term of this patent is extended or adjusted under 35 U.S.C. 154(b) by 344 days.

(21) Appl. No.: 12/431,823

(22) Filed: Apr. 29, 2009

(65) Prior Publication Data

US 2009/0273944 A1    Nov. 5, 2009

Related U.S. Application Data

(60) Provisional application No. 61/048,990, filed on Apr. 30, 2008.

(51) Int. Cl.
*F21V 7/04* (2006.01)

(52) U.S. Cl. .......... 362/551; 362/554; 362/556

(58) Field of Classification Search .......... 362/551, 362/554, 556, 577, 581, 511; 385/115, 116, 385/119
See application file for complete search history.

(56) References Cited

U.S. PATENT DOCUMENTS

| | | | |
|---|---|---|---|
| 3,191,487 A | 6/1965 | Kruythoff et al. | |
| 3,325,594 A | 6/1967 | Goldhammer et al. | |
| 3,365,580 A | 1/1968 | Cannella | |
| 3,970,844 A | 7/1976 | Fenn et al. | |
| 4,058,736 A | 11/1977 | Takahashi et al. | |
| 4,190,347 A | 2/1980 | Siegmund | |
| 4,332,439 A | 6/1982 | Lübbers et al. | |
| 4,523,803 A * | 6/1985 | Arao et al. | 385/7 |
| 4,821,114 A * | 4/1989 | Gebhardt | 358/512 |
| 4,952,022 A * | 8/1990 | Genovese | 385/116 |
| 5,115,349 A * | 5/1992 | Fuse | 359/709 |
| 5,430,816 A * | 7/1995 | Furuya et al. | 385/33 |
| 5,661,837 A * | 8/1997 | Yamamoto et al. | 385/115 |
| 5,671,084 A | 9/1997 | Kurtz | |
| 2001/0021297 A1* | 9/2001 | Akira | 385/116 |
| 2005/0047728 A1 | 3/2005 | Tobiason et al. | |

FOREIGN PATENT DOCUMENTS

| | | |
|---|---|---|
| JP | 56-083766 | 7/1981 |
| JP | 56-168607 | 12/1981 |
| WO | WO 2007/079398 | 7/2007 |

\* cited by examiner

*Primary Examiner* — Anabel Ton
*Assistant Examiner* — Danielle Allen

(57) ABSTRACT

A variable condenser for delivery of illumination, including a recursively nested circle-to-line fiber optic shape-converting cable and a focusable input lens system. At the input of the fiber optic cable, sets of individual optical fibers comprise successively smaller annuli recursively nested about a common center. At the output of the fiber optic cable, the sets of individual optical fibers comprise pairs of line segments recursively nested about the line midpoint, whereby the nesting level of the pairs of line segments has an exact or an approximate correspondence to the nesting level of the annuli. The output may be split into a plurality of lines, whereby the sets of individual optical fibers are distributed among the plurality of lines. The input lens system has a single adjustable focus means to vary the radius of an illumination spot incident upon the input of the fiber optic cable circle input.

16 Claims, 25 Drawing Sheets

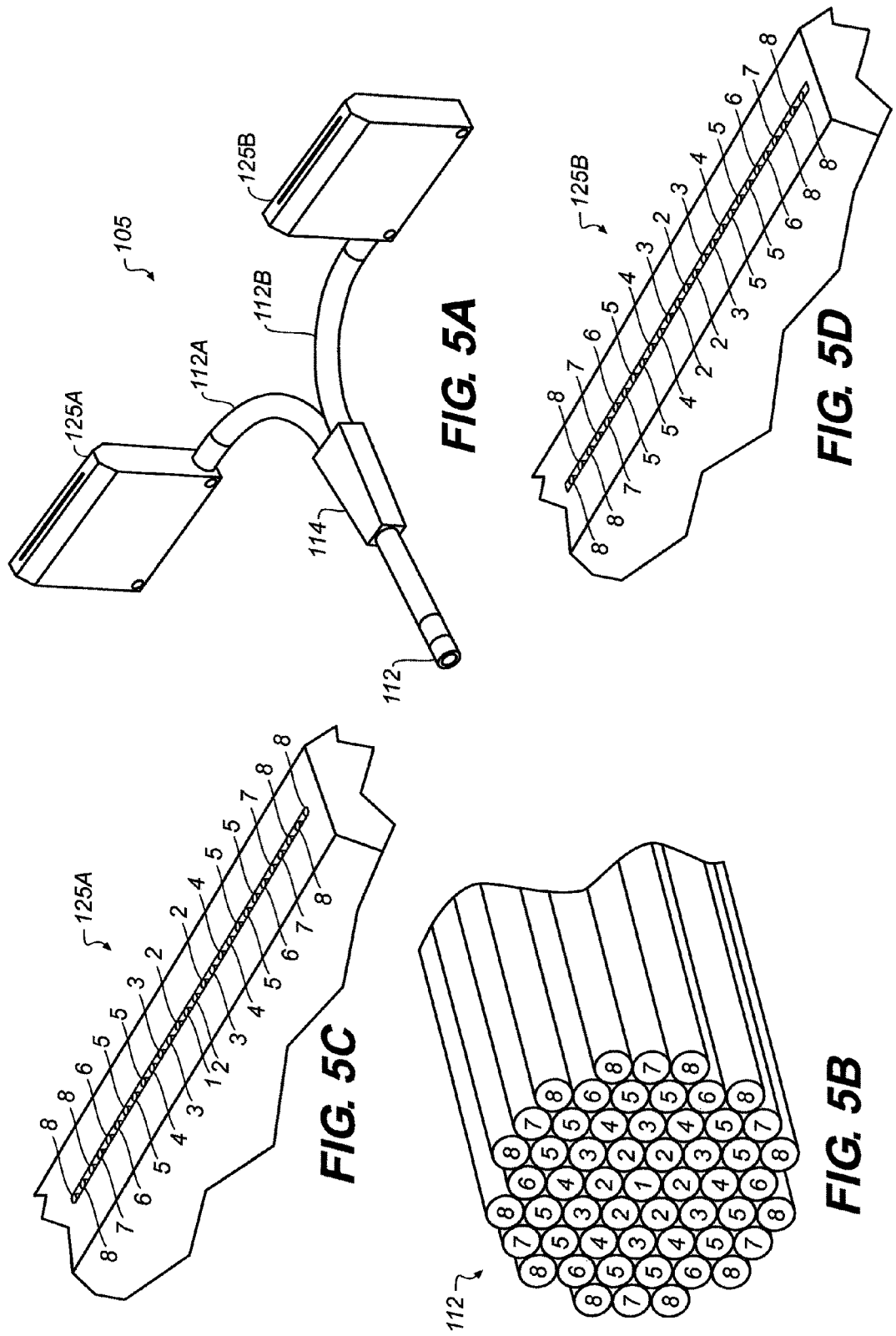

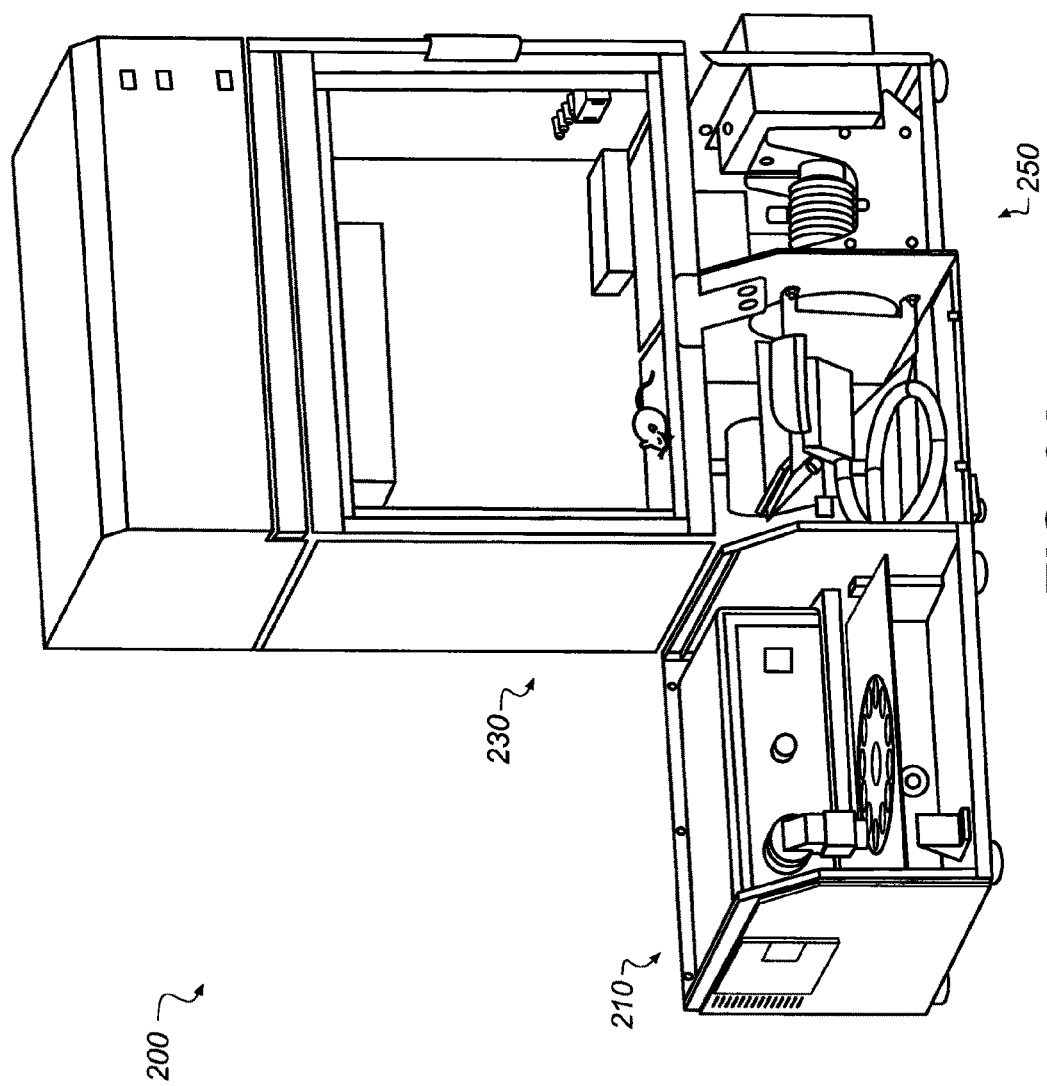

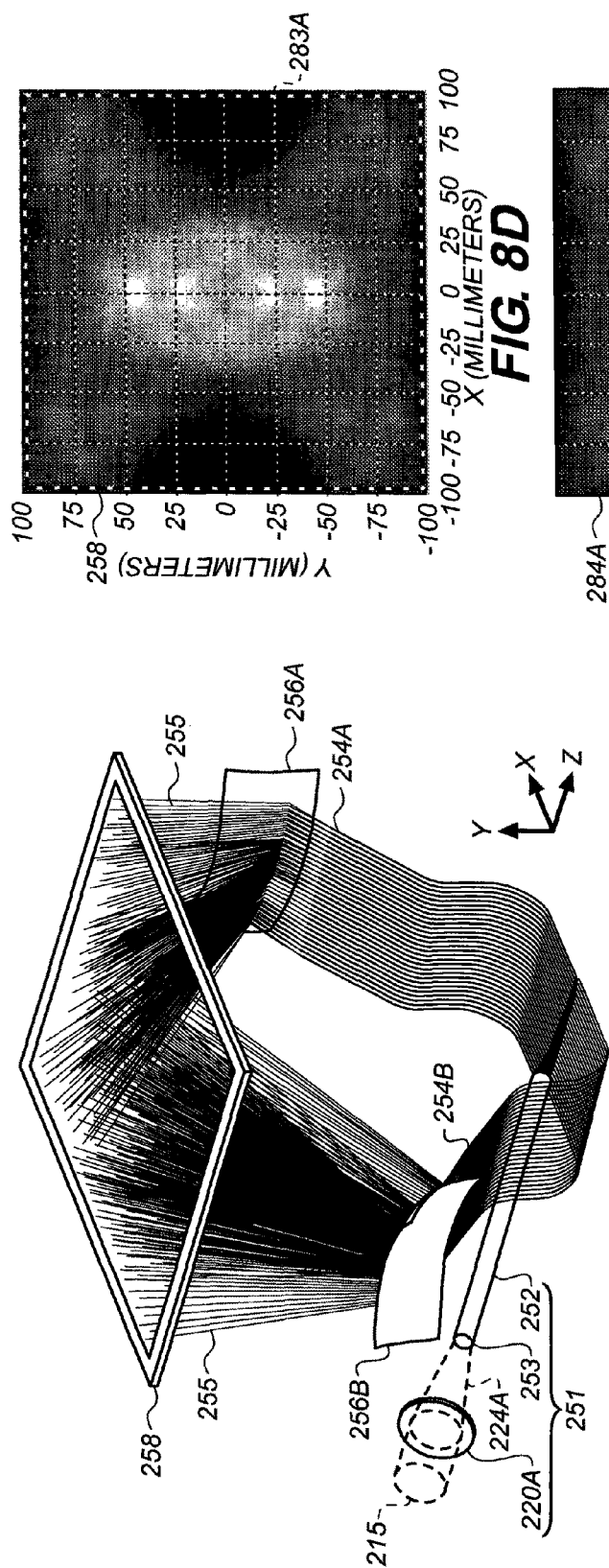
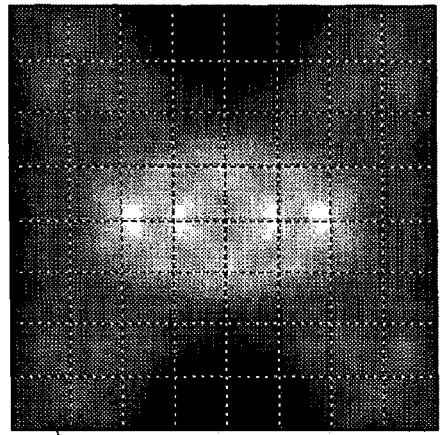
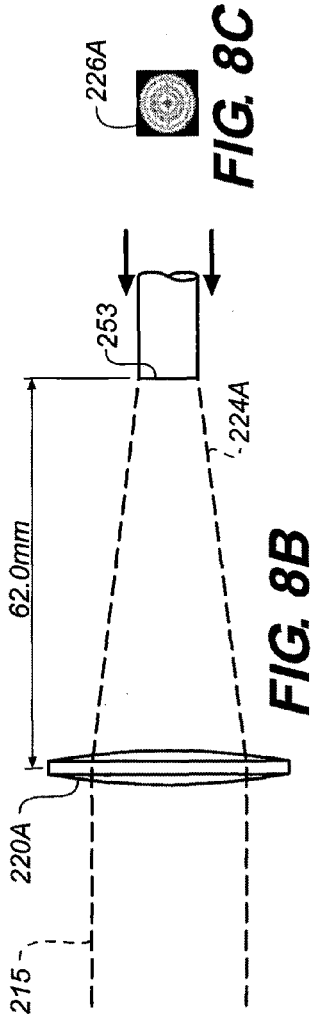
*FIG. 8A*
*FIG. 8B*
*FIG. 8C*
*FIG. 8D*
*FIG. 8E*

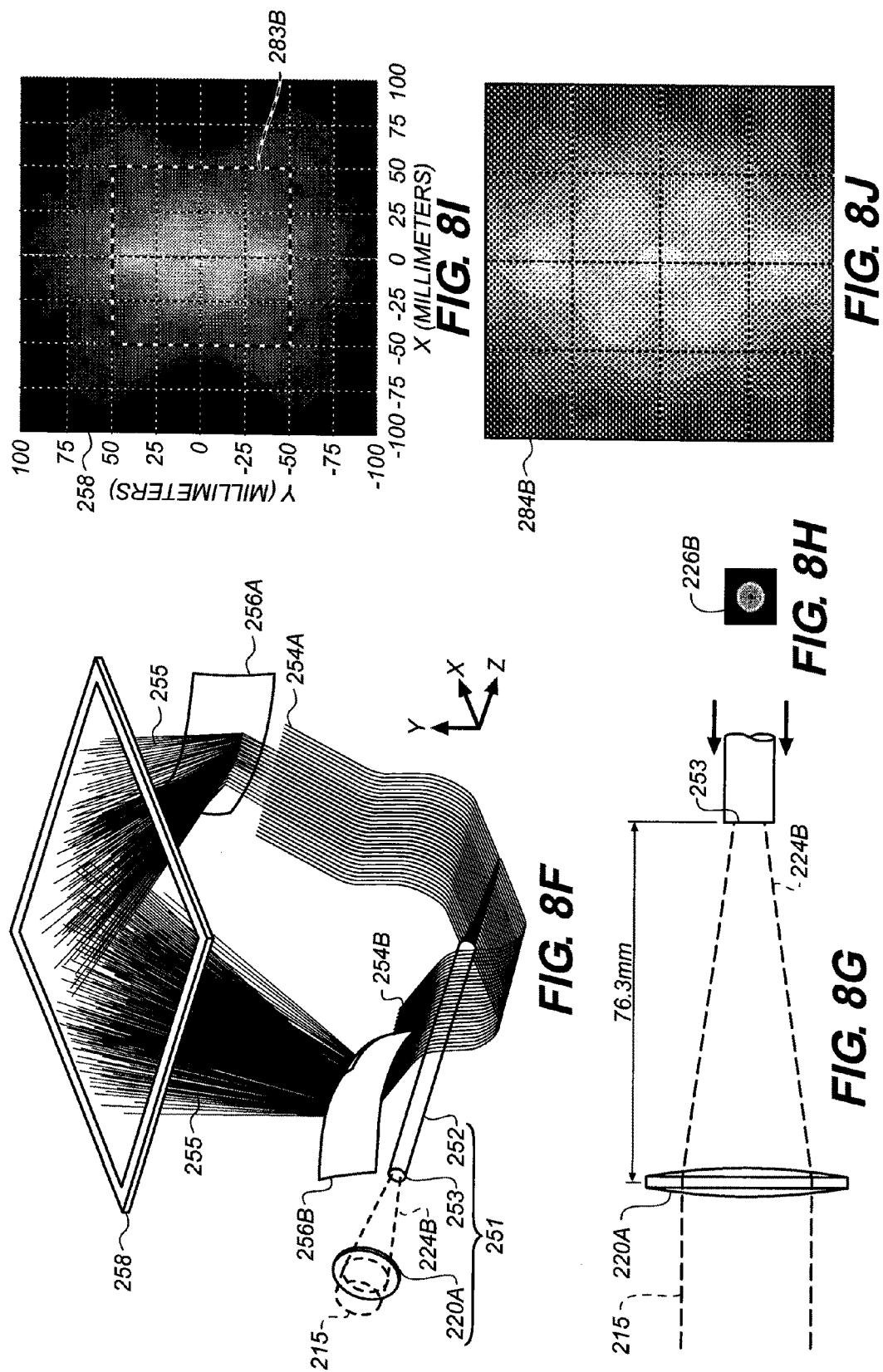

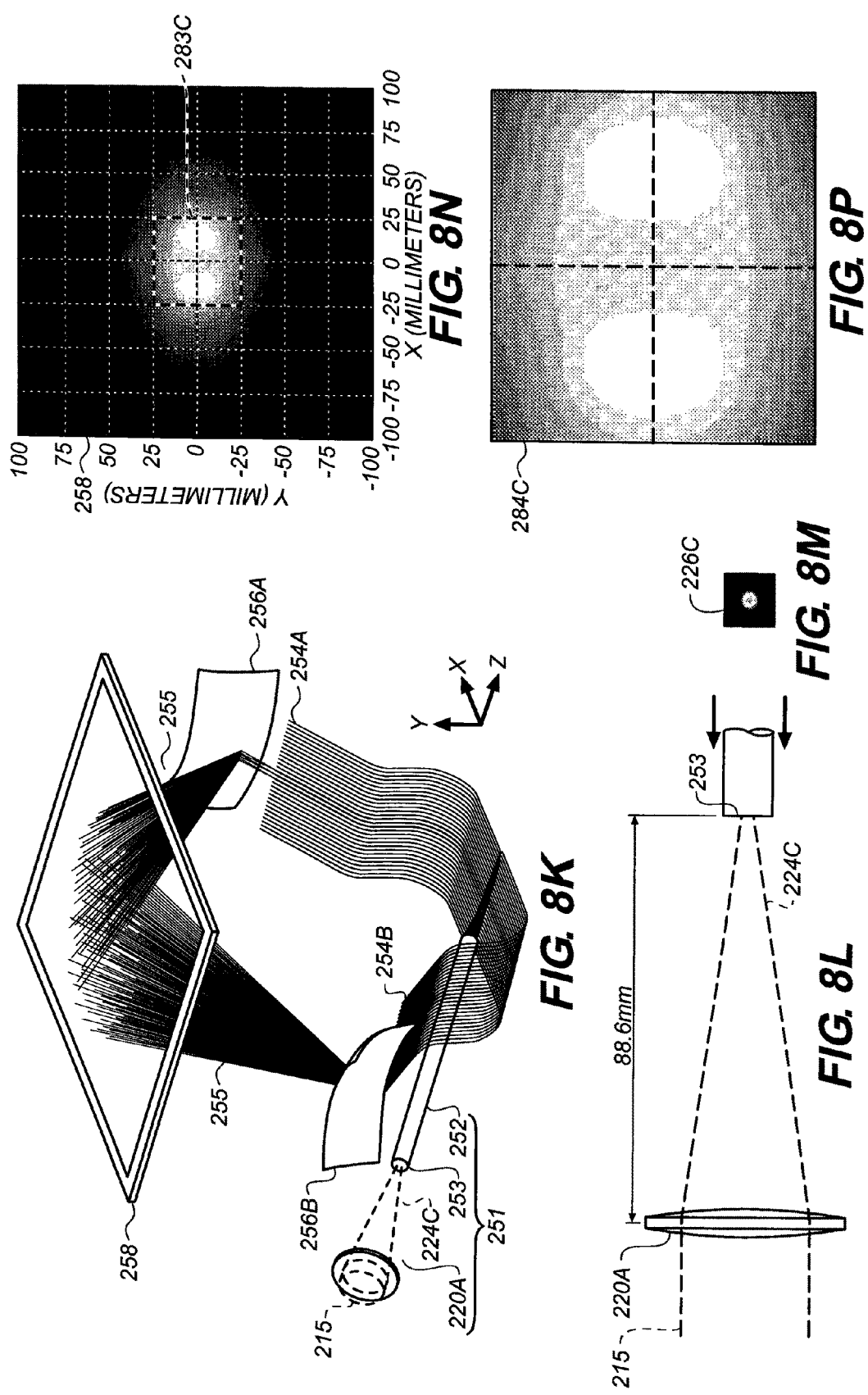

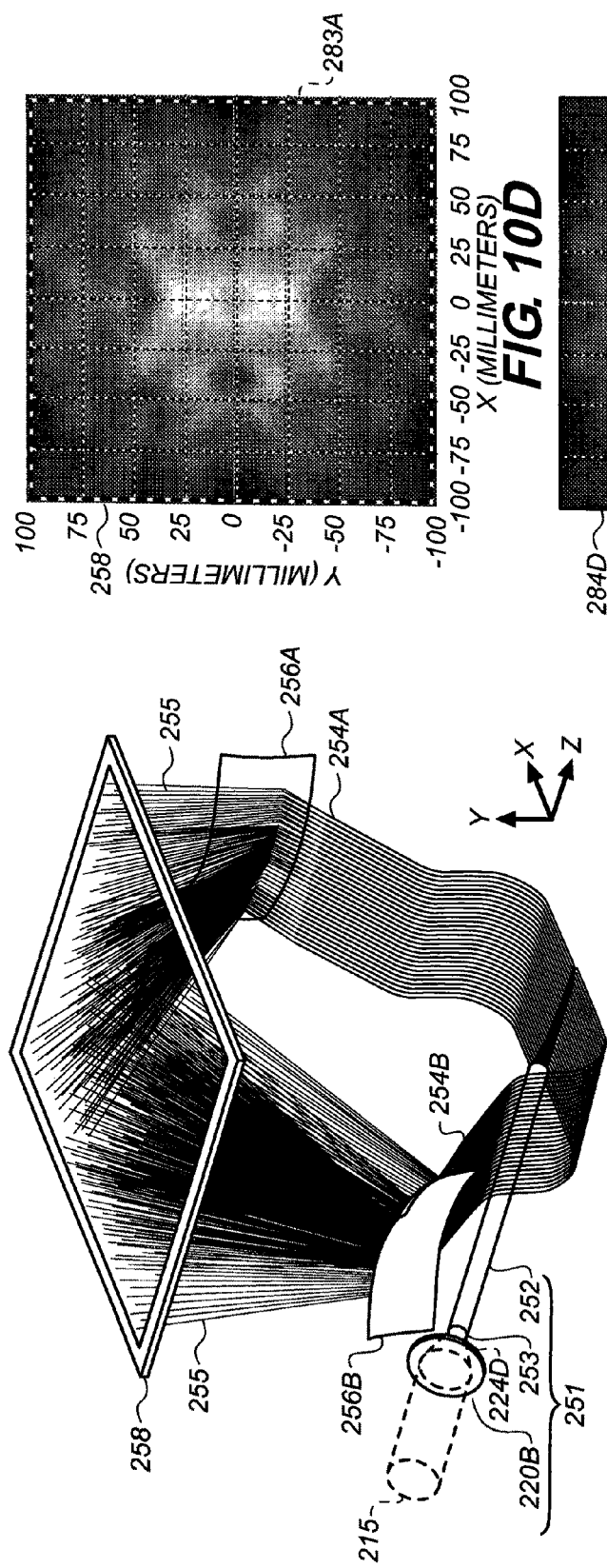
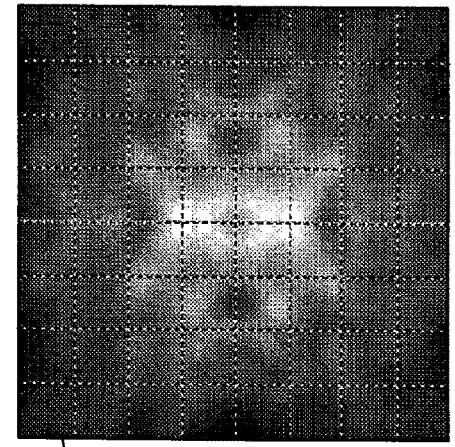
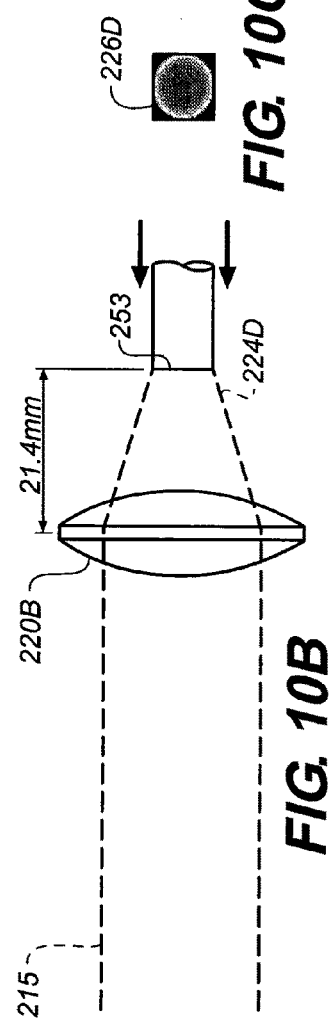
FIG. 10A
FIG. 10B
FIG. 10C
FIG. 10D
FIG. 10E

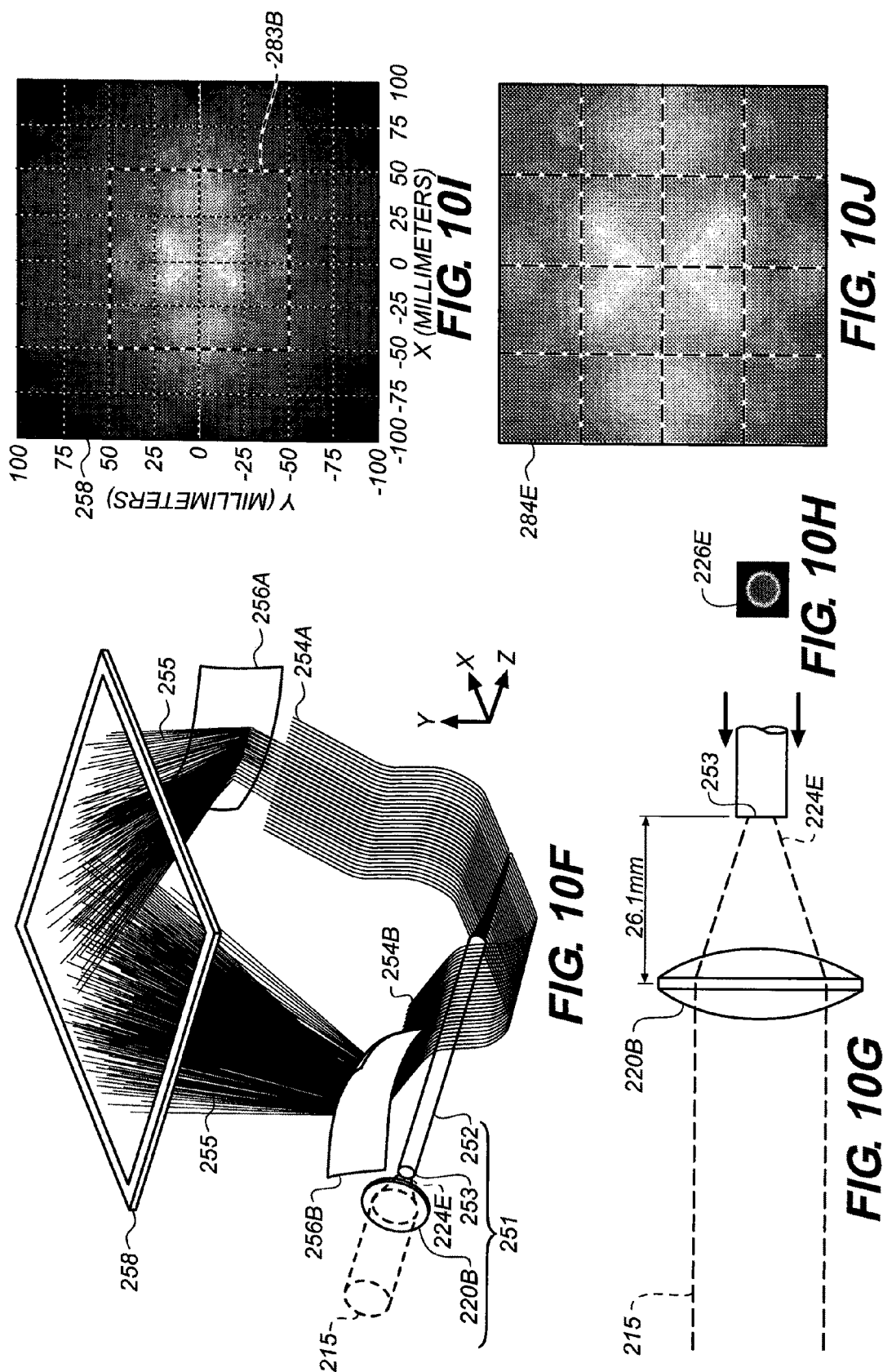

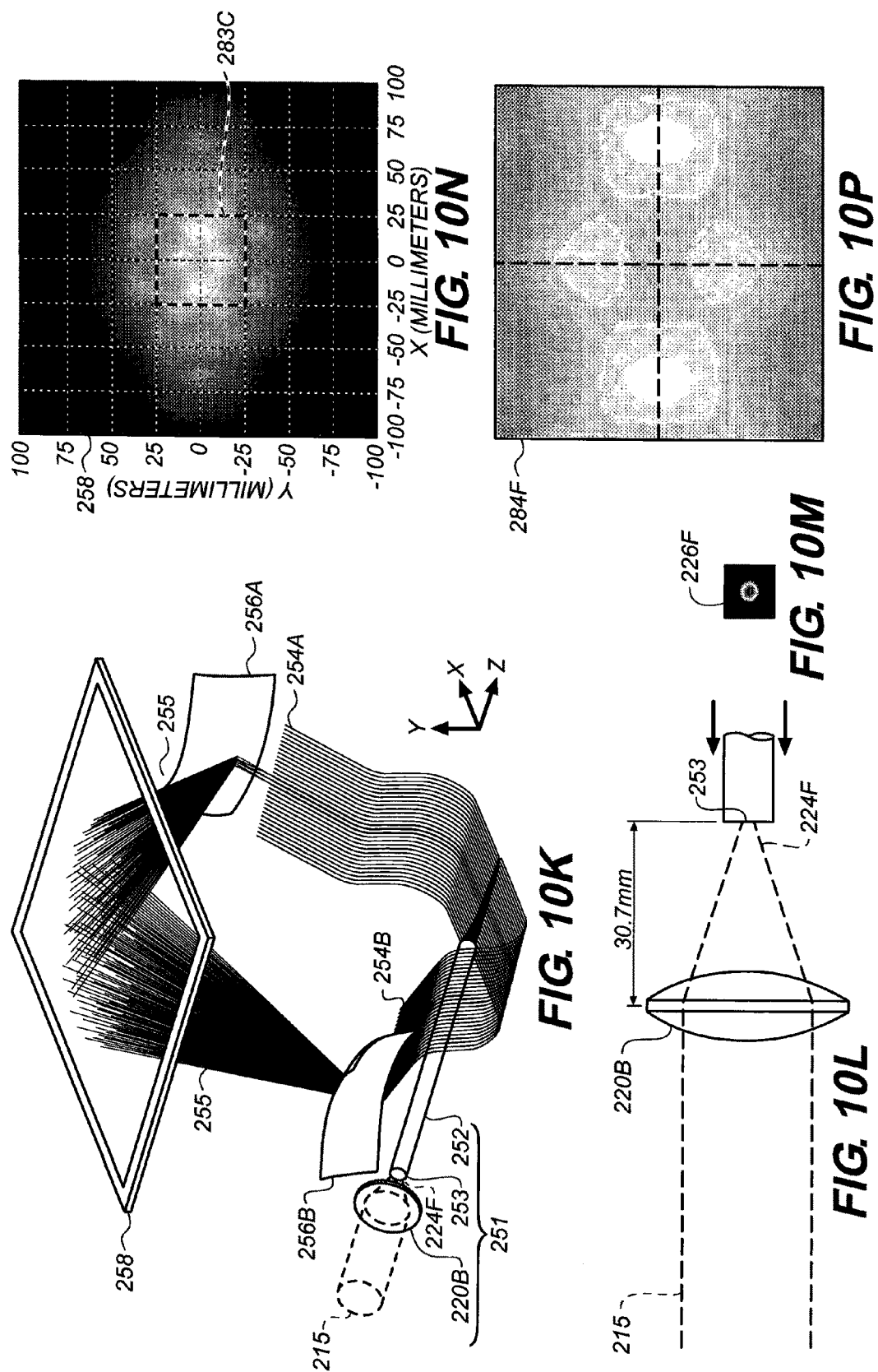

VARIABLE CONDENSER FOR DELIVERY OF ILLUMINATION INCLUDING RECURSIVELY NESTED CIRCLE TO-LINE FIBER OPTIC CONVERTER CABLE

CROSS REFERENCE TO RELATED APPLICATION

Priority is claimed from commonly assigned, provisional U.S. patent application Ser. No. 61/048,990 filed Apr. 30, 2008 by Gilbert Feke for VARIABLE CONDENSER FOR DELIVERY OF ILLUMINATION INCLUDING RECURSIVELY NESTED CIRCLE-TO-LINE FIBER OPTIC CONVERTER CABLE, the contents of which are incorporated by reference into this specification.

FIELD OF THE INVENTION

This invention relates, generally, to illumination systems and more particularly to a variable condenser for delivery of illumination. More particularly, the condenser may include a recursively nested circle-to-line fiber optic shape-converting cable and a focusable input lens system.

BACKGROUND OF THE INVENTION

Illumination systems often include a source that provides a beam of light with circular symmetry, such as a halogen, metal halide, or xenon lamp with a parabolic or elliptical reflector, or gas or solid-state lasers. Such illumination systems also often deliver illumination to targets wherein the targets benefit from the delivered illumination having the shape of a line, equivalently termed a slit, or a shape provided by an optical transformation of a line such as by a lens or mirror. Hence a conversion of the shape of the illumination from the input circle shape to the output line shape is necessary to achieve such illumination systems.

Although illumination shape conversion may be achieved by arrangements of discrete optical elements that convert the shape in free space, it is often desirable to use a shape-converting fiber optic cable for delivery of the illumination, such as in cases where the target is relatively remote or not conveniently accessible from the source. For example, U.S. Pat. No. 3,933,556 to Strack describes a fiber optic image transporting device for converting the shape of optical images, including line-like and ring-like configurations. In some cases it is advantageous to use a shape-converting fiber optic cable with a single input and a plurality of outputs. Circle-to-line fiber optic cables, equivalently termed line-to-circle fiber optic cables, for example Dolan-Jenner QF and QDF type cables with single and dual outputs, respectively, are commercially available solutions for such illumination systems.

In some cases the individual optical fibers within shape-converting fiber optic cables are substantially spatially indistinguishable, such as due to randomization within the cable or to homogeneity of the source light incident upon the input. For example, U.S. Pat. No. 4,190,347 to Siegmund describes a line illuminator for a line-scanning document copier including a fan-shaped array of optical fibers with light-output ends juxtapositioned along a line, and opposite light-receiving ends tightly bundled together. In cases where the individual optical fibers are substantially spatially indistinguishable, the delivered illumination pattern is intrinsically fixed and can only vary by extrinsic mechanical adjustments of either the cable output or intermediary optical elements, such as lenses and/or mirrors, between the cable output and the illumination target.

Various configurations are known in the art wherein the individual optical fibers within shape-converting fiber optic cables are juxtapositioned in an orderly fashion such that they are spatially distinguishable. For example, U.S. Pat. No. 3,191,487 to Kruythoff et al. describes a system for optical image transmission in which from each point of the object of which an image is to be transmitted a colored beam of light is derived whose spectral composition is representative for the position of the image point in the image and wherein the colored light beams are combined and transmitted to an image space in which they are separated so as to form the image. Also, U.S. Pat. No. 5,671,084 to Kurtz describes a fiber optic circle-to-line converter where the fibers would be randomized, or reorganized in a structured way, such that at the output end, there is a line of light with a much more uniform profile than the input light. In cases where the individual optical fibers are spatially distinguishable, the delivered illumination pattern is not intrinsically fixed but instead may be variable by varying the spatial and/or angular content of the illumination pattern incident upon the input of the fiber optic cable.

It may be desirable for an illumination system to provide adjustable concentration of the delivered light into smaller target areas. For example, in a bright-field or fluorescence imaging (or video) system with variable magnification, it may be desirable to concentrate or condense the illumination light to correspond to larger magnification, i.e., smaller field of view, so as to reduce the exposure time (or increase the frame rate) necessary to capture an image (or video) of sufficient brightness. Alternatively, in a bright-field or fluorescence imaging (or video) system wherein the target size is variable, it is often desirable to concentrate or condense the illumination light to correspond to smaller target sizes so as to reduce the exposure time (or increase the frame rate) necessary to capture an image (or video) of sufficient brightness. Arrangements of discrete optical elements, such as variable beam contractors, are well-known in the art to provide variable concentration of illumination. However, in cases where the target is relatively remote or not conveniently accessible with respect to the illumination source so that a fiber optic cable is desired for delivery of the illumination to the target, adjustable concentration or condensation of the delivered light into smaller target areas requires adjustment of the illumination delivery path with respect to the target. For example, the output of the fiber optic cable may be adjustably positioned closer to the target; however, mechanical adjustment of the output of a fiber optic cable in a relatively remote or not conveniently accessible location is often undesirable due to complexity, space constraints, and cost.

PROBLEM TO BE SOLVED

Applicant has recognized a need for a variable condenser suitable for delivery of adjustably concentrated or condensed illumination to a target that is relatively remote or not conveniently accessible with respect to the illumination source. Desirably, the shape of a beam of delivered illumination would be converted from a circle to a line and a means for changing or adjusting the concentration or condensation of the illumination would be simple and applied to the input of the delivery system. Applicant also has recognized that in some cases it would be desirable for the delivered illumination to include a plurality of lines.

SUMMARY OF THE INVENTION

One embodiment of the invention concerns a variable condenser apparatus for delivery of illumination from an illumination source. The apparatus includes a circle-to-line, fiber optic, shape-converting cable having a cable input for receiving illumination and a cable output for delivering illumination; and means for adjusting a focus of illumination on the cable input. The cable may include recursively nested fiber optics. At the cable input, sets of individual optical fibers may be recursively nested in successively smaller annuli about an input common center. In that arrangement, at the cable output, the sets of individual optical fibers may be recursively nested in at least one line about an output common center. At the cable input the annuli may define input nesting levels of the optical fibers; at the cable output, the sets of individual optical fibers may be arranged to form pairs of line segments at output nesting levels about the output common center; and the output nesting levels preferably have a correspondence to the input nesting levels. The correspondence may be exact or approximate. The individual optical fibers may be randomized within each set.

The cable may have a plurality of cable outputs. In such case, at the cable input, sets of individual optical fibers may be recursively nested in successively smaller annuli about an input common center and the annuli may define input nesting levels of the optical fibers. At each of the plurality of cable outputs, the sets of individual optical fibers may be recursively nested in at least one line about an output common center and may be arranged to form pairs of line segments at output nesting levels about the output common center. The output nesting levels have a correspondence to the input nesting levels.

At the cable input, sets of individual optical fibers may be recursively nested in successively smaller annuli about an input common center and the annuli define input nesting levels of the optical fibers; and the means for adjusting may include a lens system that varies a radius of an illumination spot incident upon the cable input, thereby varying the number of input nesting levels that deliver illumination. The radius of the illumination spot may correspond to a size of a target of illumination delivered from the cable output or to a magnification factor of a zoom lens that images a target illuminated by illumination delivered from the cable output.

Another embodiment of the invention concerns a slit lamp apparatus that includes a source of illumination; a variable condenser apparatus for delivery of illumination from the source, the condenser apparatus including a circle-to-line, fiber optic, shape-converting cable having a cable input for receiving illumination and a cable output for delivering illumination; and means for adjusting a focus of illumination on the cable input; and a cylindrical lens for receiving illumination from the cable output. The condenser apparatus may include the features previously described.

A further embodiment of the invention concerns an imaging system that includes a source of illumination; a variable condenser apparatus for delivery of illumination from the source, the condenser apparatus including a circle-to-line, fiber optic, shape-converting cable having a cable input for receiving illumination and a cable output for delivering illumination; and means for adjusting a focus of illumination on the cable input; a platen for supporting a target to be illuminated by illumination delivered from the cable output, and means for imaging an illuminated target. The condenser apparatus may include the features previously described. At least one mirror may be included to distribute the delivered illumination in a desired manner to the platen. The at least one mirror may be curved and preferably has a convex toric curvature. The means for imaging may include a zoom lens. In that event, at the cable input, sets of individual optical fibers may be recursively nested in successively smaller annuli about an input common center and the annuli define input nesting levels of the optical fibers; the means for adjusting may include a lens system that varies a radius of an illumination spot incident upon the cable input, thereby varying the number of input nesting levels that deliver illumination; and the radius of the illumination spot may correspond to a magnification factor of the zoom lens. The radius of the illumination spot may correspond to a size of a target supported on the platen.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 5A shows an overall view of a recursively nested circle-to-line fiber optic shape-converting cable with dual line outputs in accordance with the present invention. FIGS. 5B-5D show enlarged, detailed perspective views of the cable input and cable outputs of FIG. 5A, in accordance with the invention.

FIGS. 6A and 6B show a perspective view and detailed view, respectively, of an embodiment of the present invention wherein a variable condenser comprising an input lens with adjustable focus and the fiber optic cable of FIGS. 5A-5D is used in combination with convex toric mirrors in a macroscopic multi-modal imaging system.

FIGS. 8A, 8F and 8K show perspective views of optical ray tracing simulations based on an embodiment like that shown in FIGS. 6A-6B and 7. FIGS. 8B-8E, 8G-8J and 8L-8N and 8P show detailed views of portions of FIGS. 8A, 8F and 8K.

FIGS. 10A, 10F and 10K show perspective views of optical ray tracing simulations based on another embodiment like that shown in FIGS. 6A-6B, and 7. FIGS. 10B-10E, 10G-10J and 10L-10N and 10P show detailed views of portions of FIGS. 10A, 10F and 10K.

DETAILED DESCRIPTION OF THE INVENTION

The invention now will be described in detail with particular reference to certain preferred embodiments thereof, but it will be understood that variations and modifications can be effected within the spirit and scope of the invention.

The invention comprises a variable condenser for delivery of illumination comprised of a recursively nested circle-to-line fiber optic shape-converting cable and an input lens system.

Figure 1A:
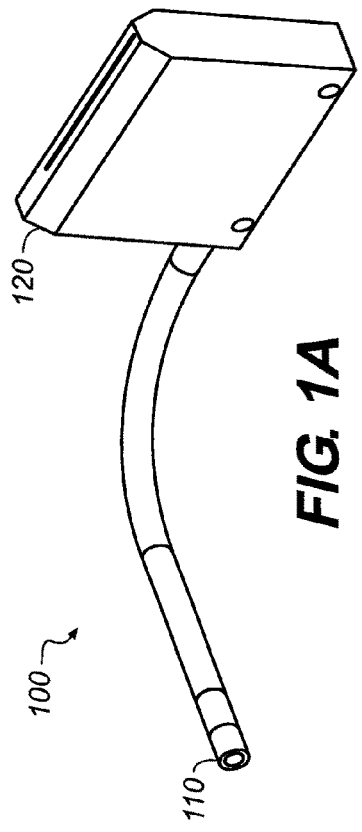
FIG. 1A shows an overall view of a variable condenser according to the invention.
Figure 1C:
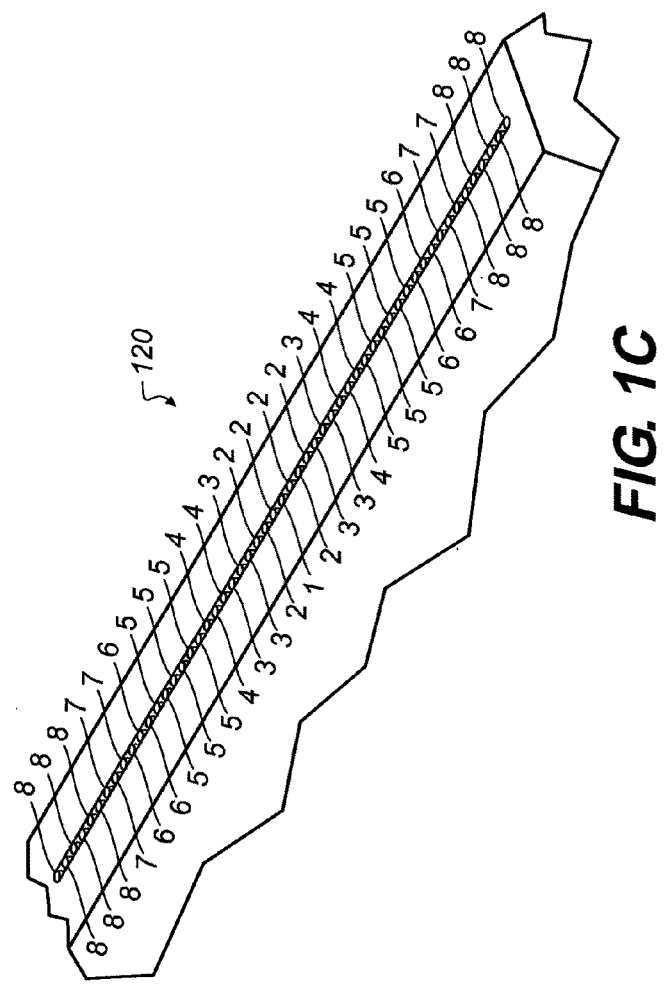
FIGS. 1B and 1C sow, respectively, detailed perspective views of a cable input of a recursively nested circle-to-line fiber optic shape-converting cable, and a single line cable output in accordance with the present invention.
Figure 1B:
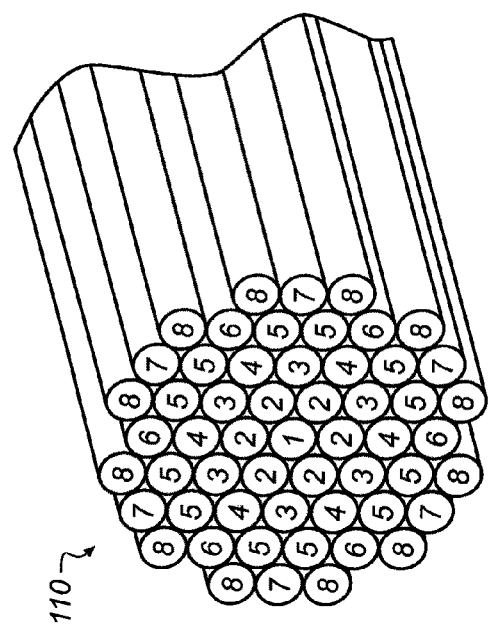
Figure 2A:
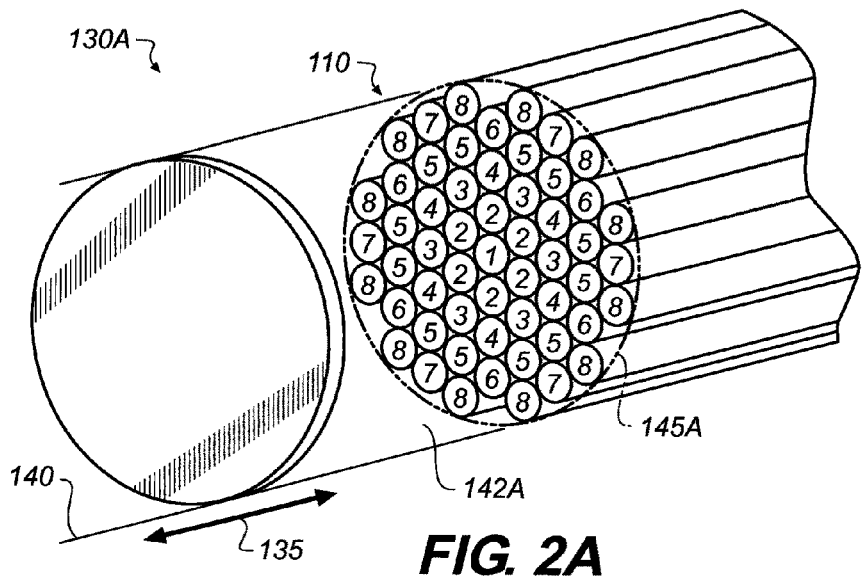
FIGS. 2A-2N and 2P-2Q show detailed views of the cable input and cable output of a variable condenser comprising an input lens with adjustable focus and the fiber optic cable of FIGS. 1A-1B in accordance with the present invention.
Figure 2B:
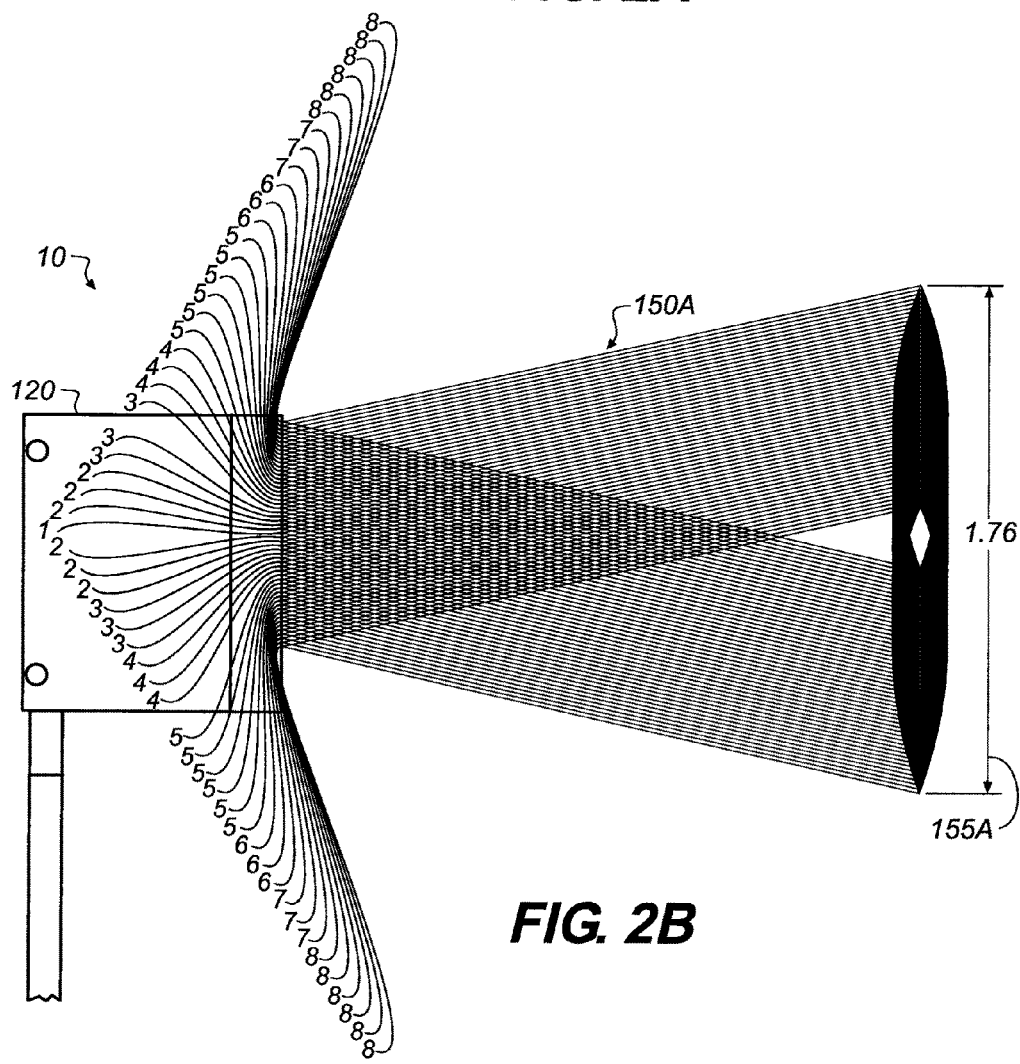
Figure 2C:
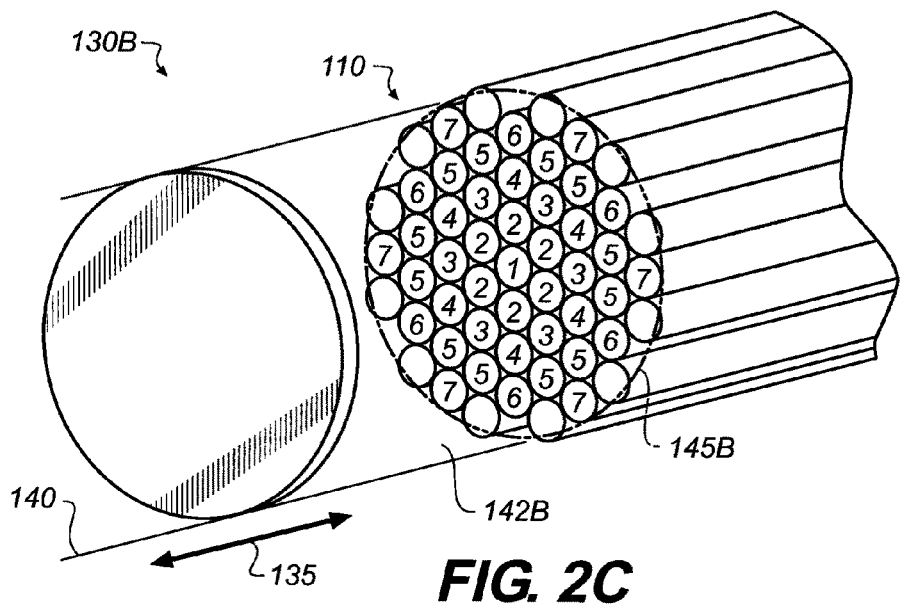
Figure 2D:
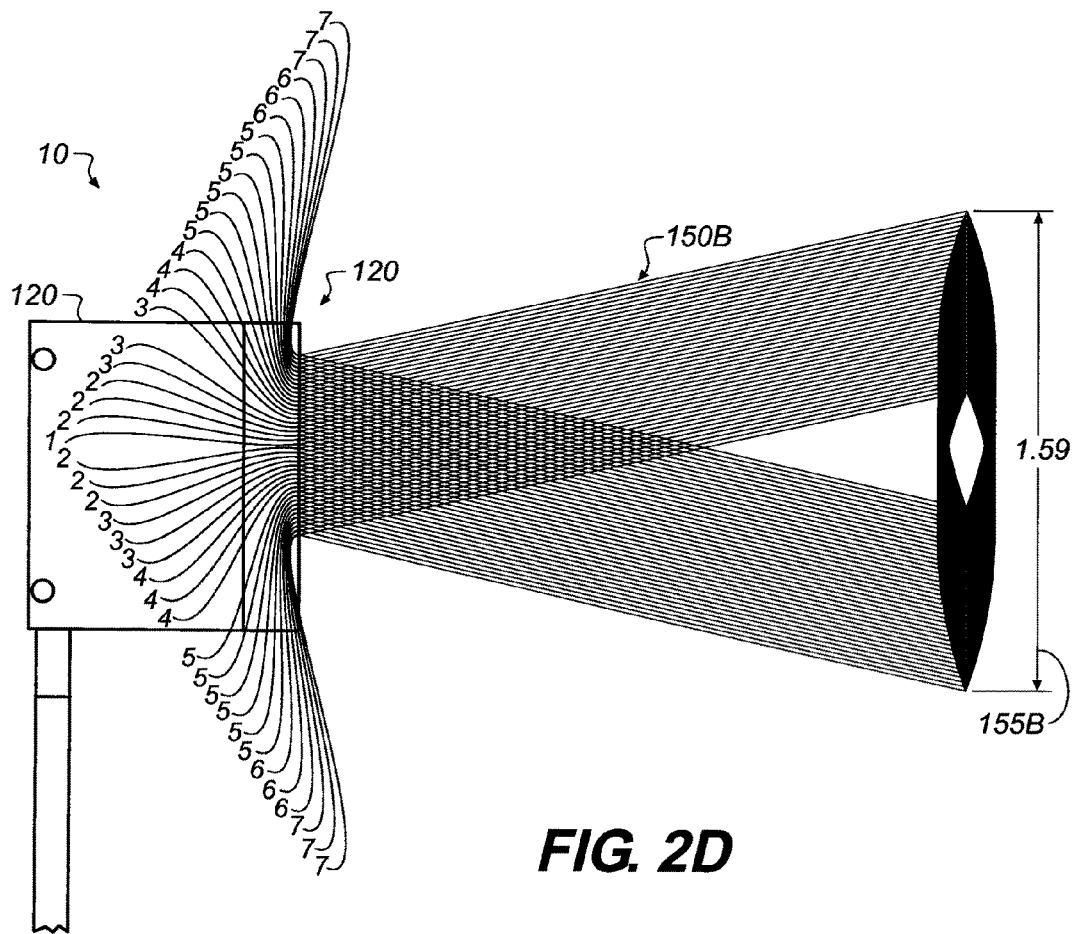
Figure 2E:
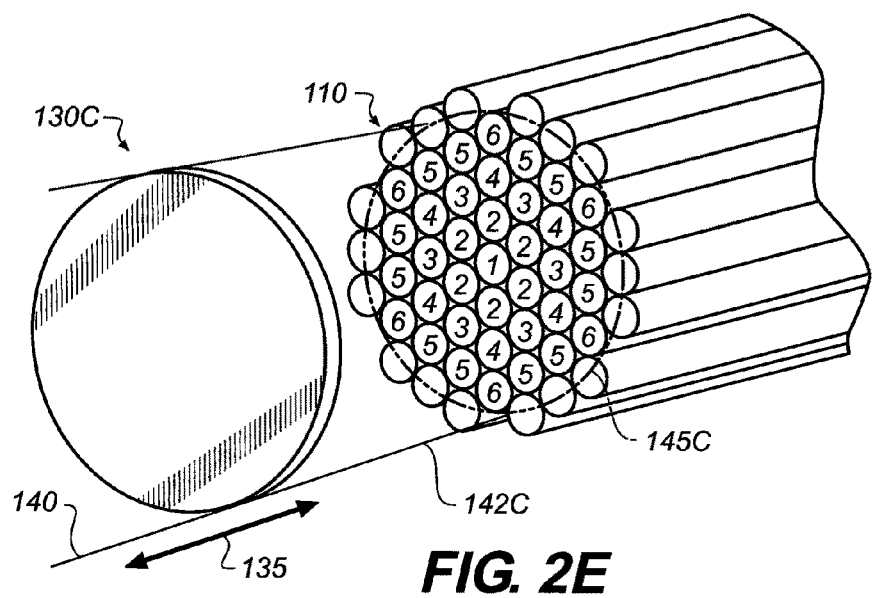
Figure 2F:
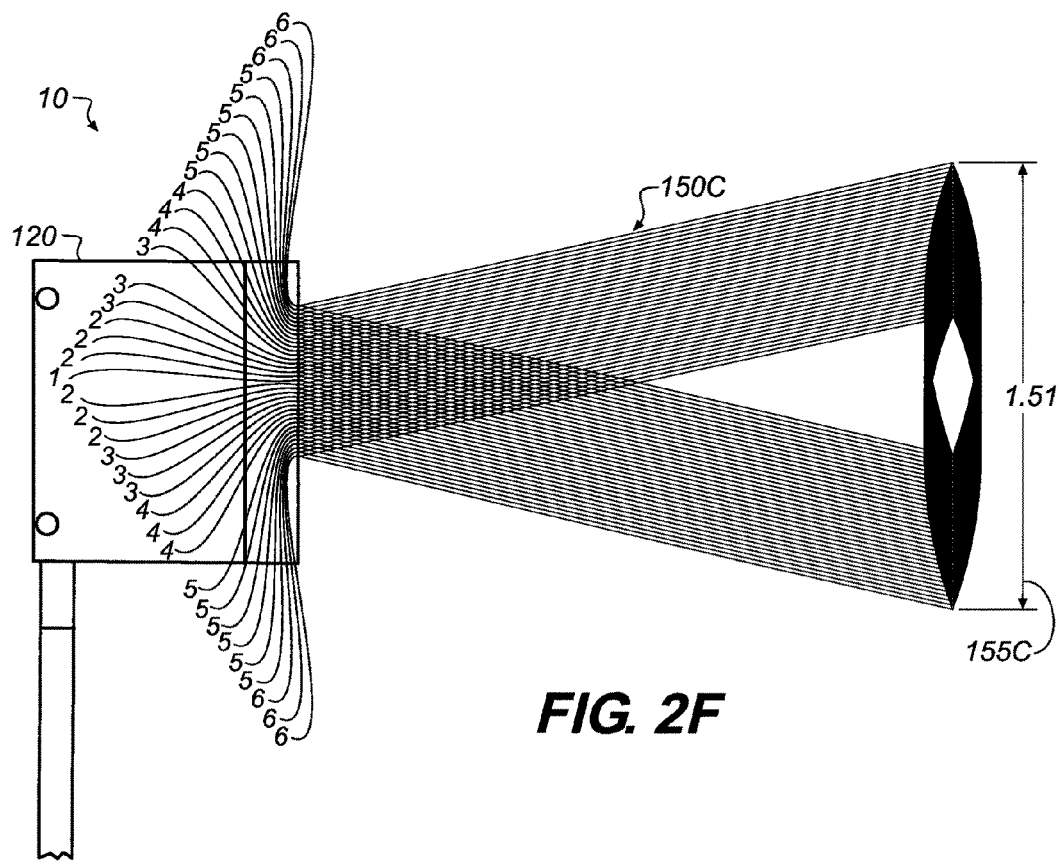
Figure 2G:
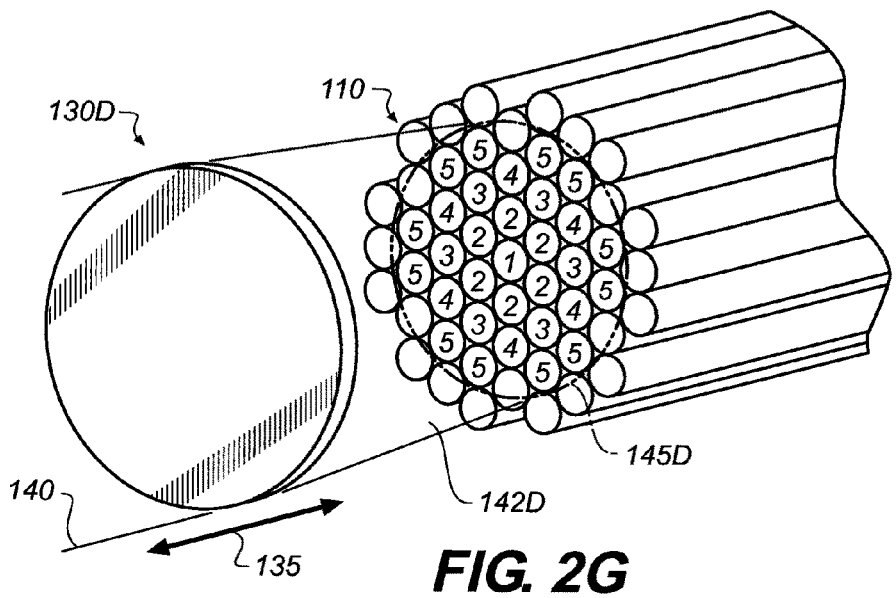
Figure 2H:
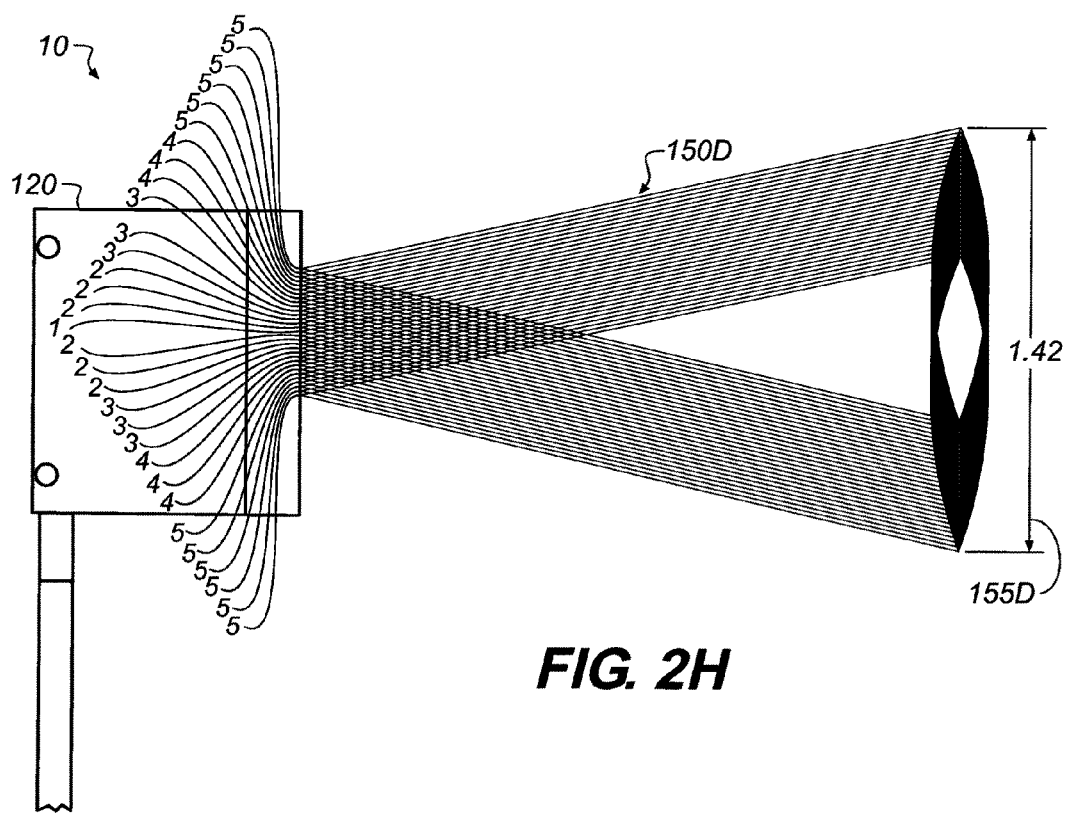
Figure 2I:
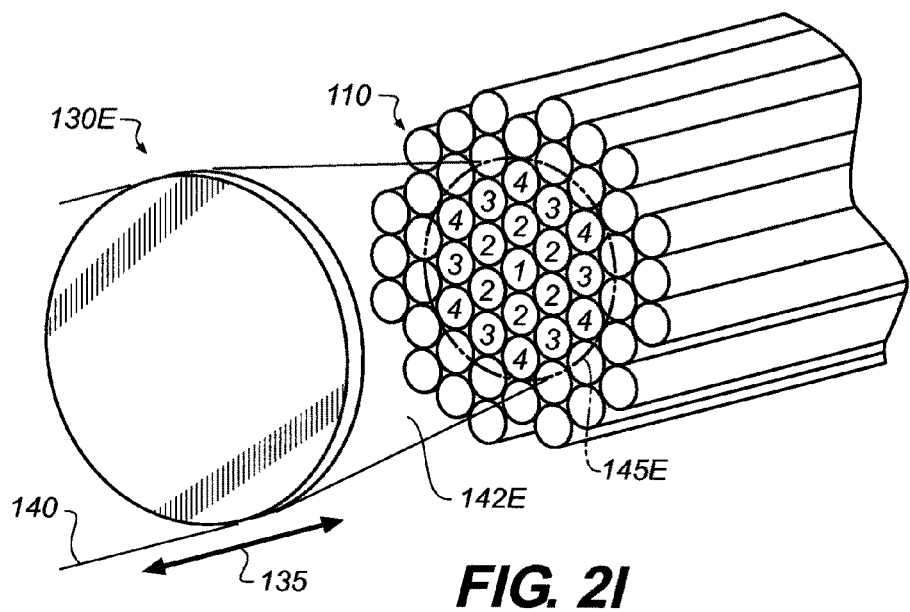
Figure 2J:
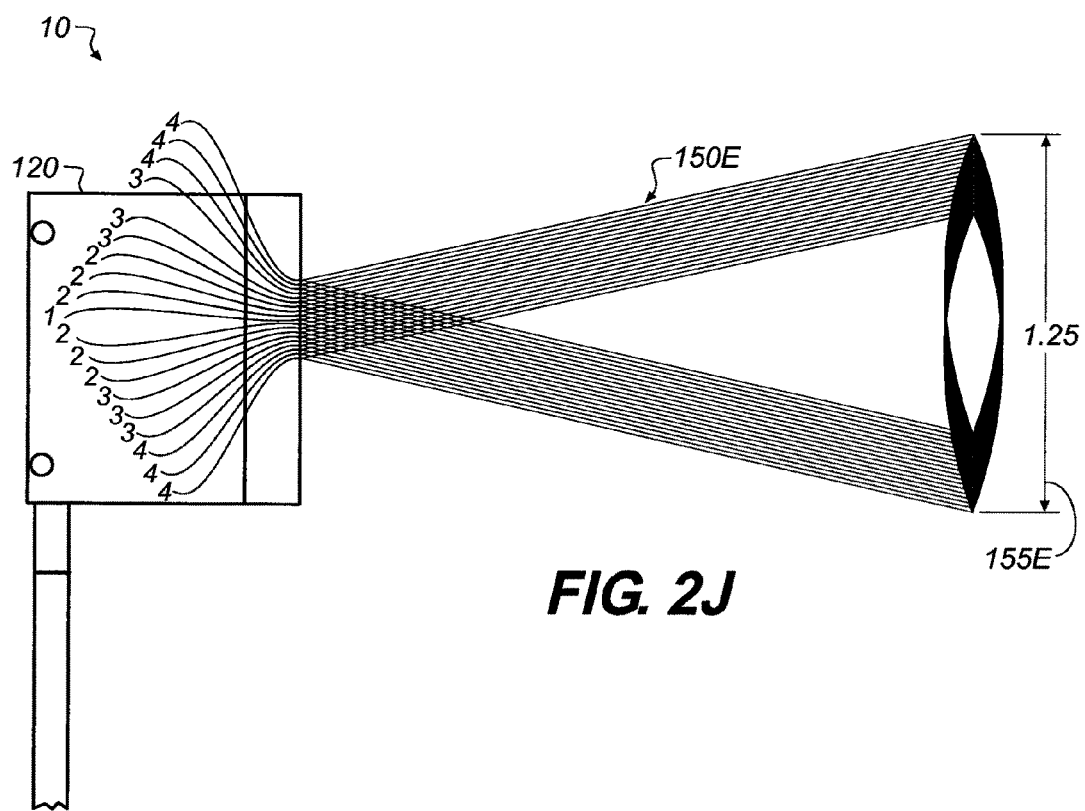
Figure 2K:
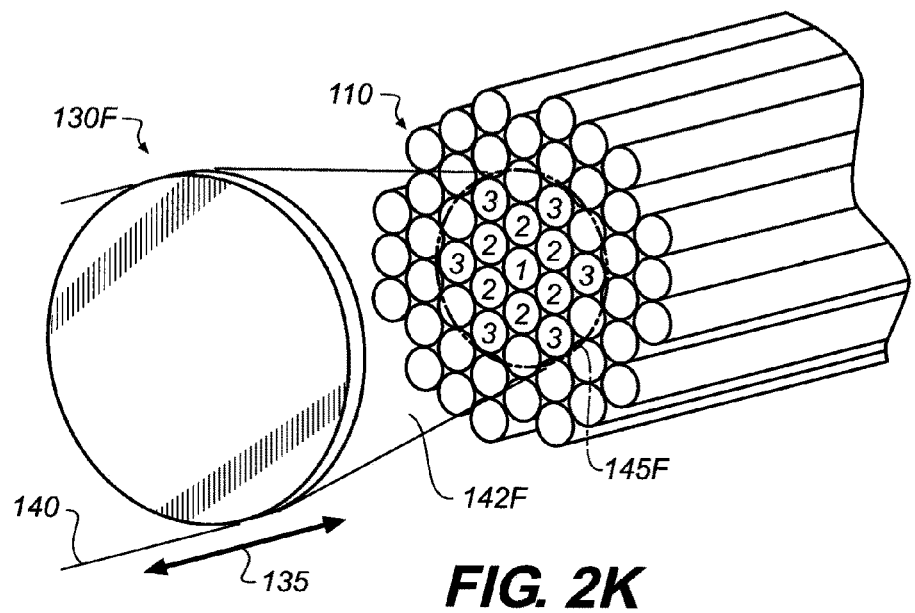
Figure 2L:
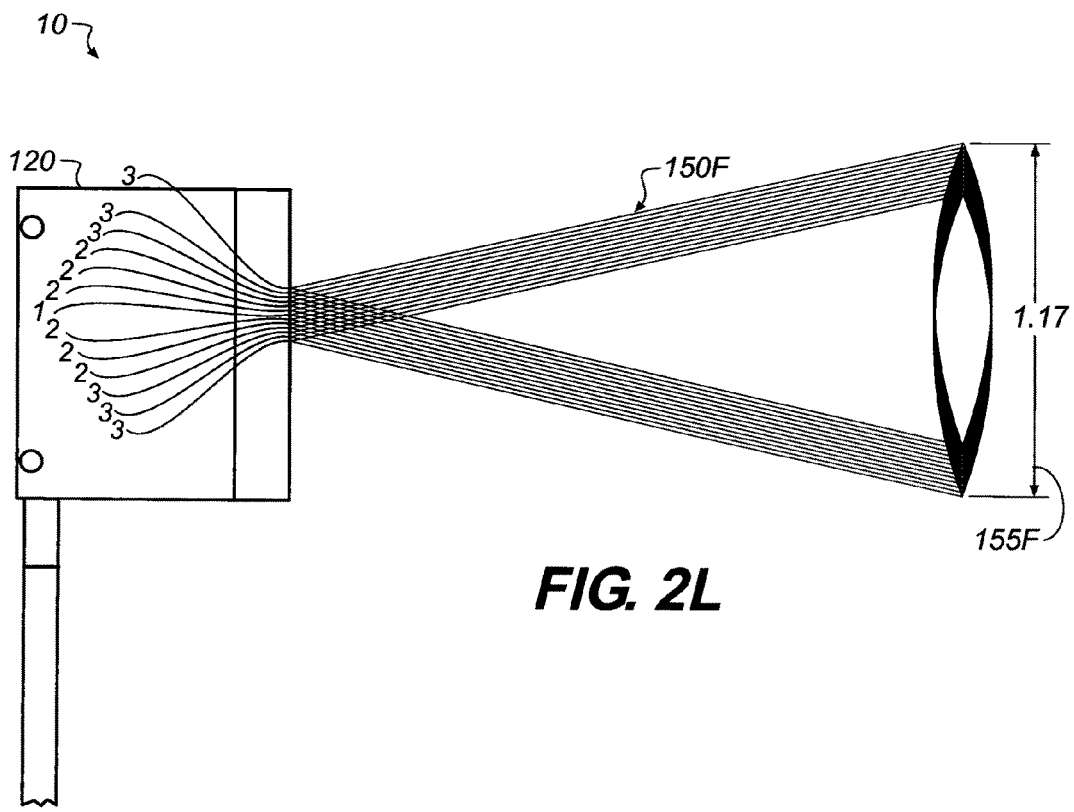
Figure 2M:
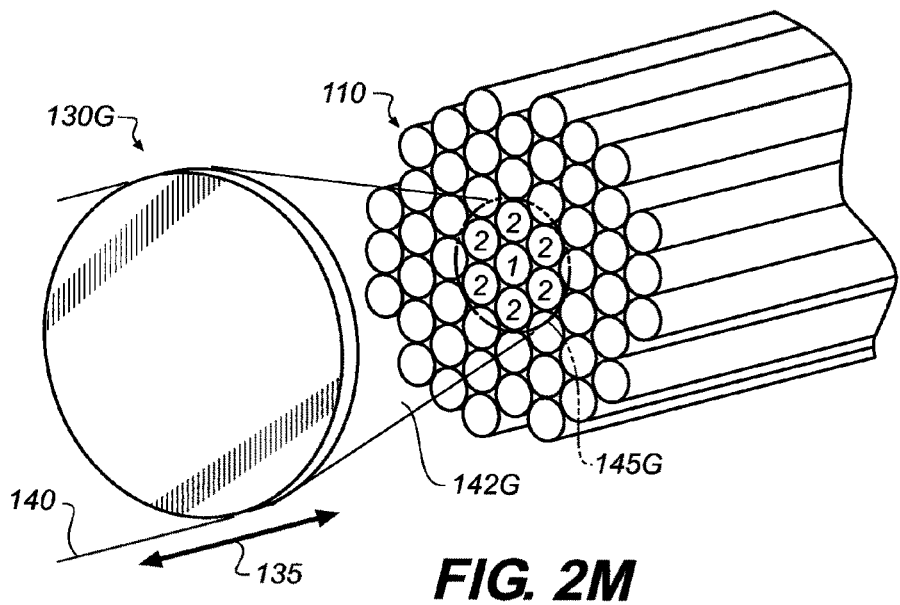
Figure 2N:
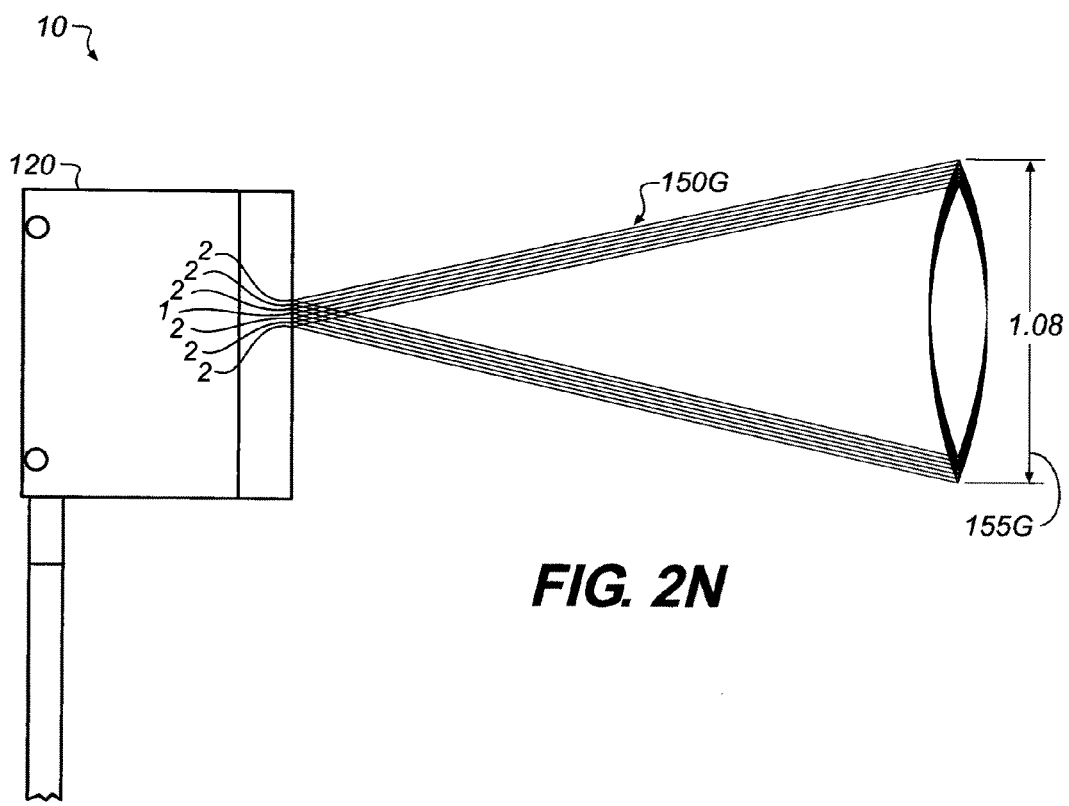
Figure 2P:
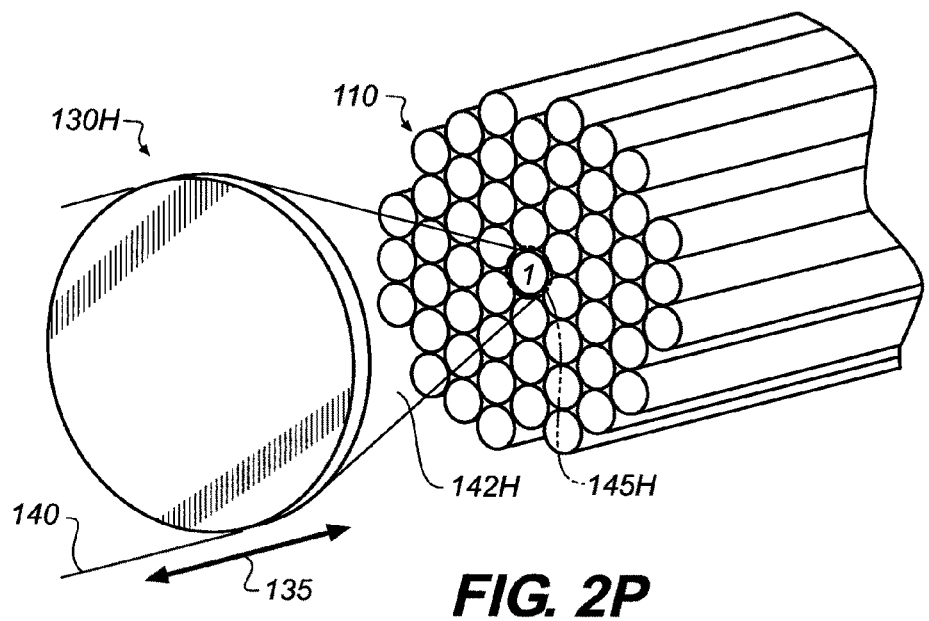
Figure 2Q:
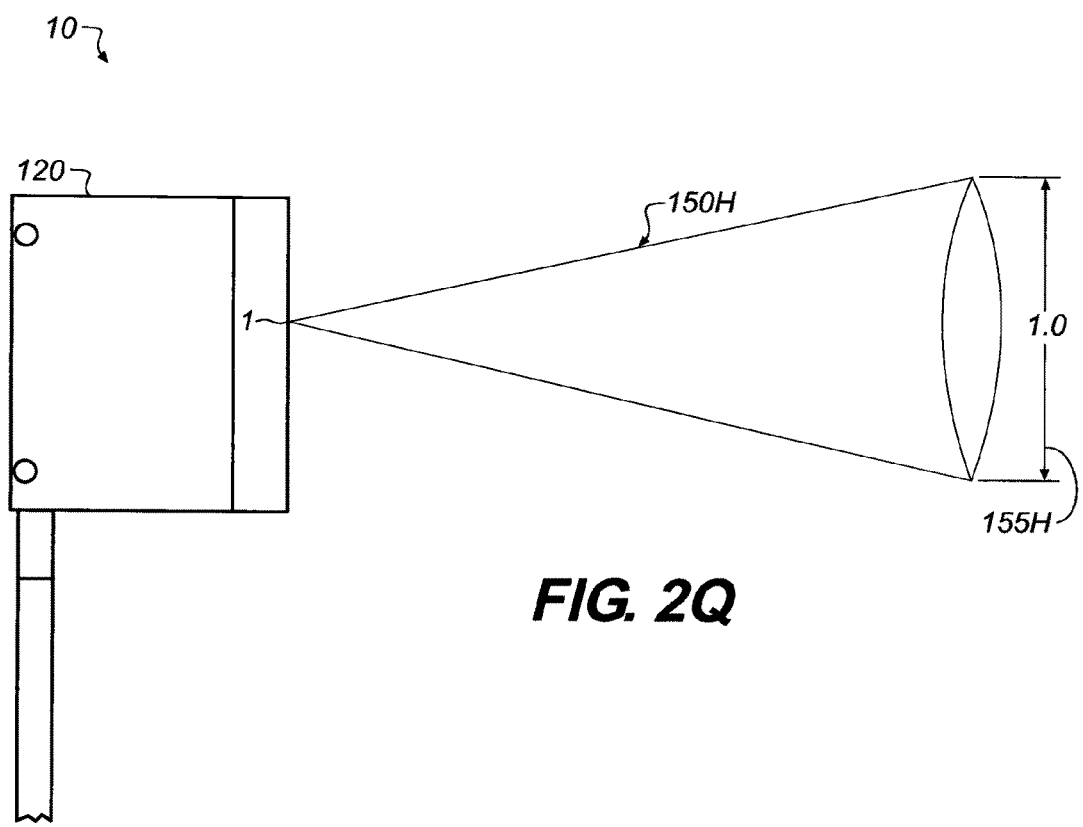

FIGS. 1A-1C show an overall view and detailed perspective views of a recursively nested, circle-to-line fiber optic shape-converting cable 100 with a single line cable output 120 in accordance with the present invention. At a cable input 110 of cable 100, sets of individual optical fibers 8, 7, 6, 5, 4, 3, 2, and 1 are arranged as shown in FIG. 1B in successively smaller annuli recursively nested about a common center. As used in this specification, "recursively nested" means arranged such that sets of elements, wherein the sets have a particular geometric structure with incrementally varying scale, have a common geometric center. So, in FIG. 1B, a first nesting level is established by a set including central fiber 1; a second nesting level, by a set including fibers 2; a third nesting level, by a set including fibers 3; a fourth nesting level, by a set including fibers 4 having a different distance to fiber 1 than fibers 3; a fifth nesting level, by a set including fibers 5; a sixth nesting level, by a set including fibers 6 having a different distance to fiber 1 than fibers 5; a seventh nesting level, by a set including fibers 7; an eighth nesting level, by a set including fibers 8 having a different distance to fiber 1 than fibers 7; and so on. At cable output 120, the sets of individual optical fibers 8, 7, 6, 5, 4, 3, 2, and 1 are arranged as shown in FIG. 1C as pairs of line segments recursively nested about the line midpoint at fiber 1. As shown, the nesting level of the pairs of line segments in FIG. 1C has a correspondence to the nesting level of the annuli in FIG. 1B, as may be appreciated in FIGS. 1B-1C by matching the numerical designations of optical fibers at input 110 with the numerical designations at output 120. So, in FIG. 1C, a first nesting level again is established by fiber 1; a second nesting level, by fibers 2 arranged on each side of fiber 1; and so on. Those skilled in the art will understand that two or more parallel lines of recursively nested fibers could be used without departing from the scope of the invention. The correspondence of nesting levels may be exact or approximate. The individual optical fibers may be randomized within each set or nesting level. It should be understood that a relatively small number of nesting levels and the relatively small number of individual optical fibers populating each nesting level, are shown in FIGS. 1B-1C purely for the purpose of simplified illustration; and that generally any number of nesting levels and any number of individual optical fibers populating each nesting level may be used, limited only by the manufacturability of the cable. Hence the figures may better be interpreted as illustrating arrangements of groups of optical fibers rather than arrangements of individual optical fibers.

FIGS. 2A-2N and 2P-2Q show detailed views of cable input 110 and cable output 120 as embodied in a variable condenser 10 comprising an input lens with adjustable focus and cable 100. In this embodiment, the focus, i.e., the distance between the input lens and cable input 110, can be adjusted along a direction indicated by an arrow 135 to produce configurations designated 130A, 130B, 130C, 130D, 130E, 130F, 130G, and 130H in FIGS. 2A, 2C, 2E, 2G, 2I, 2K, 2M and 2P, respectively, so as to adjust the radius of the illumination spot from a beam of illumination 140 incident upon cable input 110 to radii 145A, 145B, 145C, 145D, 145E, 145F, 145G, and 145H, respectively, by focusing the beam of illumination into light paths 142A, 142B, 142C, 142D, 142E, 142F, 142G, and 142H, respectively. These configurations thus can provide illumination input to the individual optical fibers at varying numbers of nesting levels less than or equal to those populated by optical fibers (or equivalently optical fiber groups) 8, 7, 6, 5, 4, 3, 2, and 1, respectively. Hence, illumination light is delivered from cable output 120 in patterns 150A, 150B, 150C, 150D, 150E, 150F, 150G, and 150H, respectively, so as to obtain relative pattern lengths 155A, 155B, 155C, 155D, 155E, 155F, 155G, and 155H, respectively. As such, the illumination is adjustably concentrated at the output by using the illustrated variable condenser 10.

Figure 3:
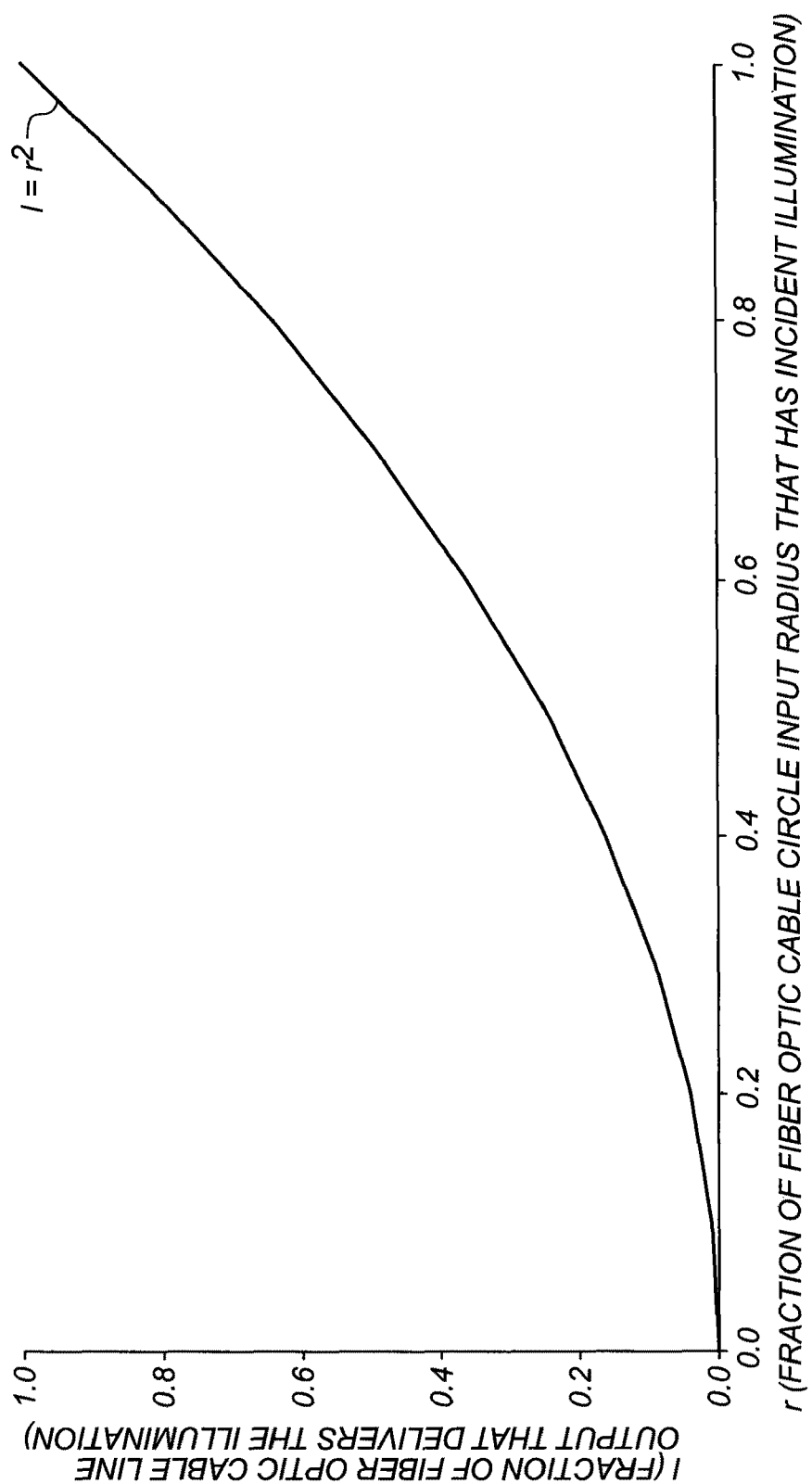
FIG. 3 shows a graph depicting the relationship between the fraction of the fiber optic cable line output that delivers the illumination versus the fraction of the fiber optic cable circle input radius that has incident illumination in accordance with the present invention.
Figure 4C:
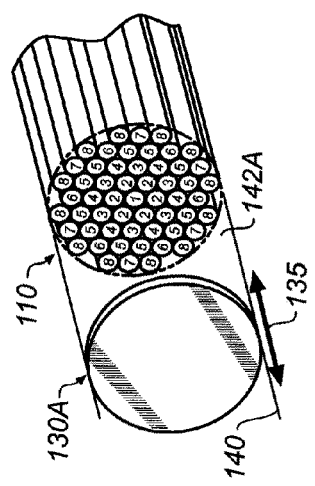
FIGS. 4A-4F show series of detailed views of an embodiment of the present invention wherein the variable condensers of FIGS. 2A-2N and 2P-2Q are used in combination with a cylindrical lens to produce a slit lamp.
Figure 4B:
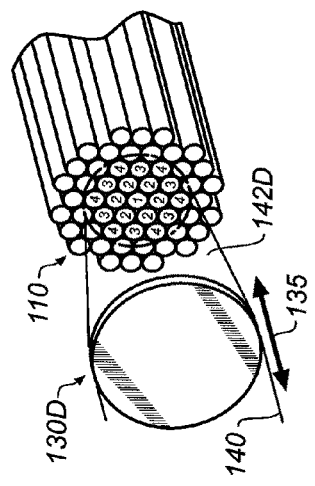
Figure 4A:
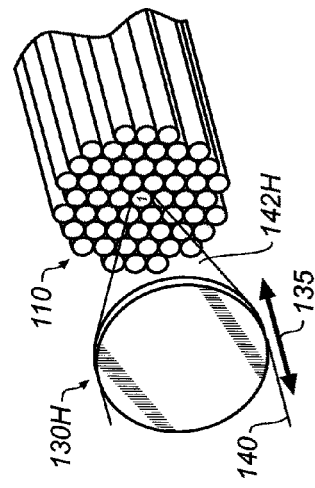
Figure 4F:
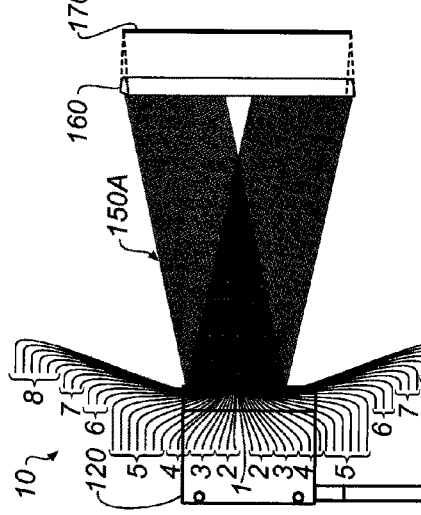
Figure 4E:
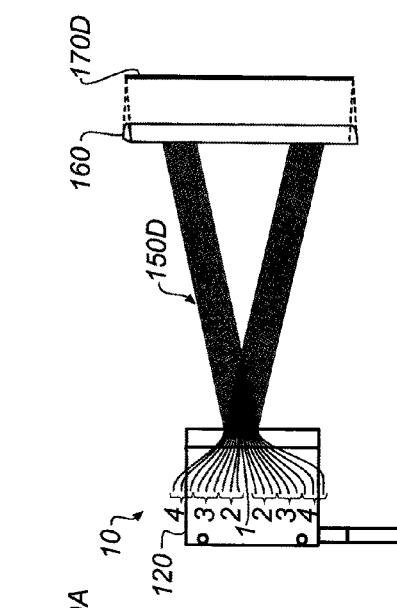
Figure 4D:
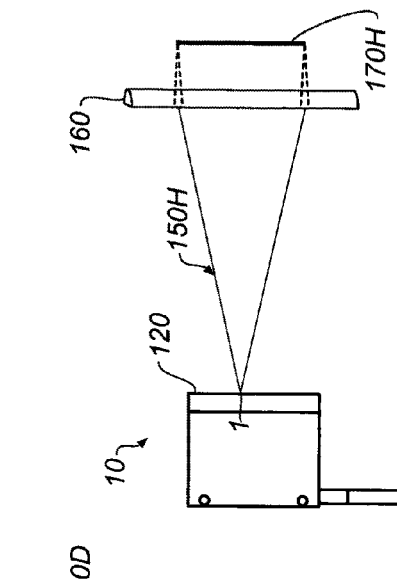

FIG. 3 shows a graph depicting the relationship between l, the fraction of the fiber optic cable line output that delivers the illumination, and r, the fraction of the fiber optic cable circle input radius that has incident illumination, in accordance with the present invention. The relationship is described in the limit where the individual optical fibers are small with respect to the cable; the relationship is approximate within the limit. The relationship is that l is equal to $r^2$, which can be physically interpreted by appreciating that the population size of the individual optical fibers populating successively less nesting levels becomes less in number in proportion to the area of the incident light at the input.

FIGS. 4A-4F show a series of detailed views of an embodiment of the present invention wherein the variable condenser 10 of FIG. 2 is used in combination with a cylindrical lens 160 to produce a slit lamp providing slits of illumination 170A, 170D, and 170H, corresponding to input lens configurations 130A, 130D, and 130H. The variable condenser 10 may provide a desirable improvement for slit lamps known in the art, such as used for machine vision and ophthalmology applications, especially in situations where discrete optical elements to provide similar functionality would be cumbersome or otherwise undesirable, for example portable slit lamps for ophthalmologic diagnosis for homebound patients or in rural or undeveloped patient populations.

FIGS. 5A-5D show an overall view and detailed perspective views of a recursively nested circle-to-line fiber optic shape-converting cable 105 with dual single line cable outputs 125A, 125B in accordance with the present invention. At the input 112 of the fiber optic cable, sets of individual optical fibers 8, 7, 6, 5, 4, 3, 2, and 1 comprise successively smaller annuli recursively nested about a common center. At a bifurcation 114, the fibers are divided substantially equally to form dual output cables 112A, 112B having respective dual single line cable outputs 125A, 125B. The sets of individual optical fibers are distributed between the two outputs so that they comprise two pairs of line segments. Each pair of line segments is recursively nested about each of the two line midpoints. As shown, the nesting level of the two pairs of line segments in FIGS. 5C-5D has a correspondence to the nesting level of the annuli in FIG. 5B, as may be appreciated in FIGS. 5C-5D by matching the numerical designations at input 112 with the numerical designations at outputs 125A, 125B. The correspondence may be exact or approximate. The individual optical fibers may be randomized within each set or nesting level. In general, the output of the fiber optic cable may be split into a plurality of lines, whereby the sets of individual optical fibers are distributed among the plurality of lines such that the sets of individual optical fibers comprise a plurality of pairs of line segments recursively nested about the plurality of line midpoints, whereby the nesting level of the plurality of pairs of line segments corresponds to the nesting level of the annuli.

Figure 6B:
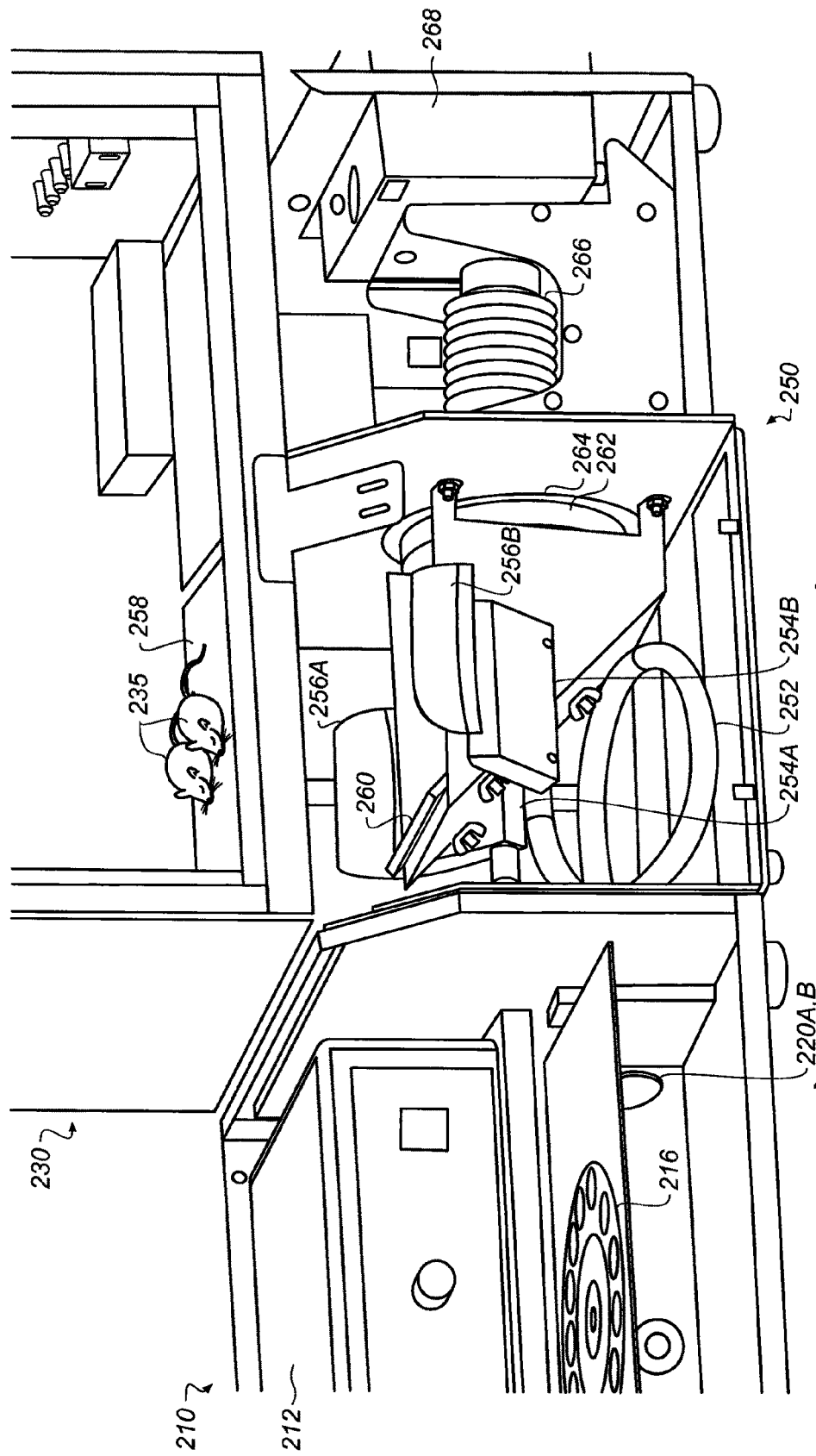

FIGS. 6A and 6B show a complete perspective view and fragmentary, enlarged perspective view, respectively, of an embodiment of the present invention wherein a macroscopic multimodal imaging system 200 includes an illumination source module 210 that encloses an illumination source 212. A variable condenser 251 includes an input lens 220A, 220B with adjustable focus and a fiber optic cable 252 of the type shown in FIGS. 5A-5D. Cable 252 includes dual single line cable outputs 254A and 254B that are used in combination with convex toric mirrors 256A and 256B. The toric-shaped surface of the mirrors is a zone of a surface generated by a circle rotated about an axis in the plane of the circle where the axis does not intersect the circle. The convex toric mirrors are employed to distribute illumination from outputs 254A, 254B in a desired manner over a two-dimensional field of view, though mirrors using alternative geometries may be used. Imaging system 200 is similar to the commercially available Kodak In-Vivo Imaging System FX Pro and includes a sample chamber 230 and an image capture module 250. Illumination source 212 includes a lamp, not shown in FIGS. 6A-6B, and an illumination filter wheel 216 containing a plurality of illumination filters. A target of illumination 235, for example a single immobilized small animal, a plurality of immobilized small animals, an electrophoresis gel, a plurality of electrophoresis gels, or an immobilized human appendage such as a hand or foot, is inserted into sample chamber 230 where it rests on a transparent platen 258. Image capture module 230 also includes a fold mirror 260 to direct the image path toward a diopter lens 262, and beyond to the plane of an image filter wheel 264 containing a plurality of image path filters, a zoom lens 266, and a finally a camera 268. As illustrated, input lens 220A, 220B is located in illumination source module 210; whereas, fiber optic cable 252 is located in image capture module 250. This arrangement provides robust opto-mechanical registrations of input lens 220A, 220B with source 212 and of the illumination from cable outputs 254A, 254B with target 235, therefore necessitating only one additional opto-mechanical registration between the illumination source module and the image capture module.

Figure 7:
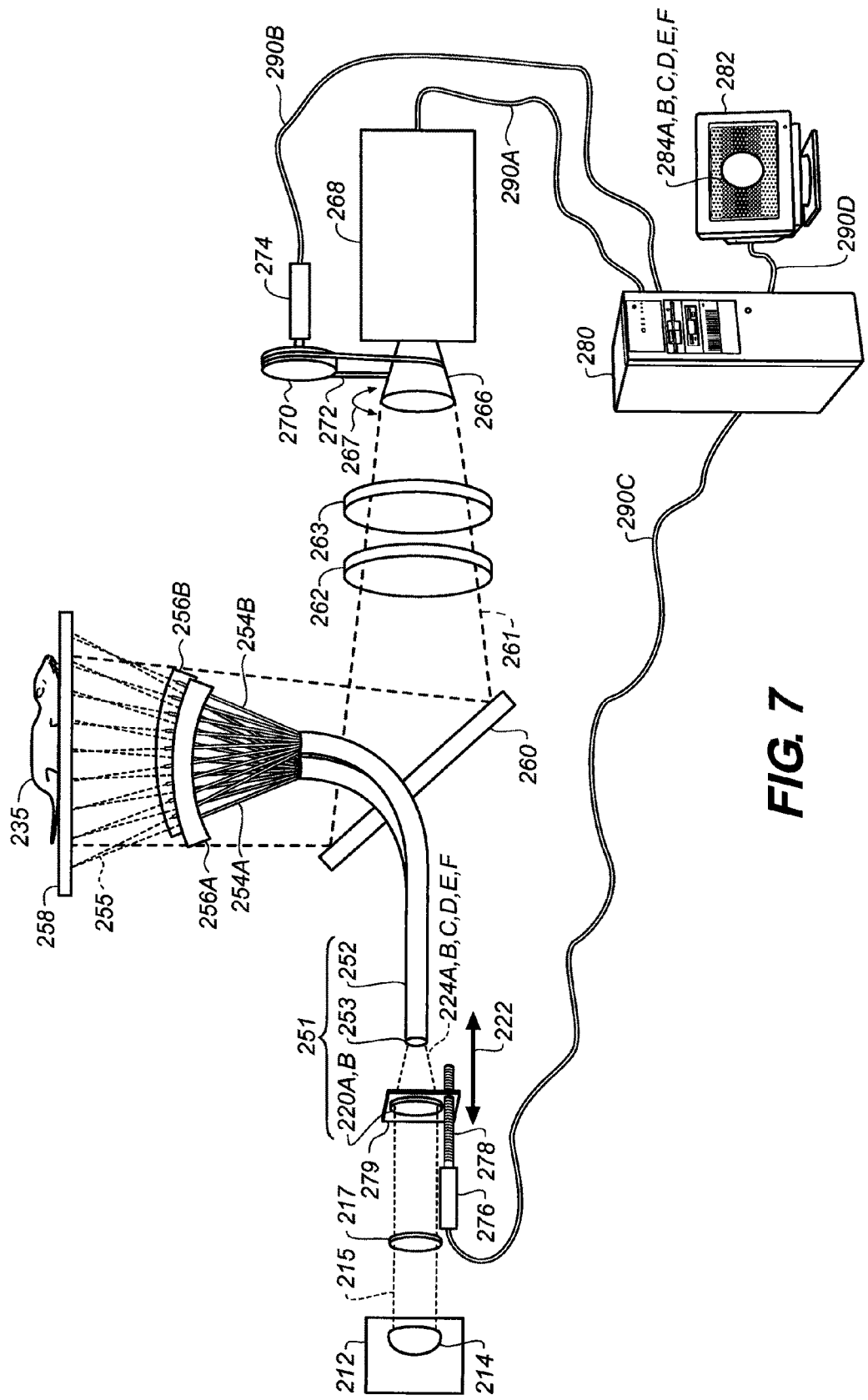
FIG. 7 shows a diagrammatic view of the embodiment shown in FIGS. 6A and B.

FIG. 7 shows a diagrammatic view of the embodiment shown in FIGS. 6A and 6B. Means are provided for changing or adjusting the focus of input lens 220A, 220B on a cable input 258, so as to enable changing the number of fibers 1-8 that are illuminated. A lamp 214, such as a xenon lamp with a parabolic reflector, is located in illumination source 212 and emits a beam of light 215 through an illumination filter 217, such as an interference filter suitable for fluorescence excitation, to input lens 220A, 220B of variable condenser 251. Input lens 220A, 220B is mounted in a lens mount 279 that is adapted to be translated in the direction indicated by arrow 222 by lead screw 278 when the lead screw is mechanically rotated by motor 276. Translation of the lens enables change or adjustment of the focus of the input light 224A, 224B, 224C, 224D, 224E, 224F at cable input 253 of fiber optic cable 252. Those skilled in the art will appreciate from this figure that other arrangements of such optical elements may comprise the means for changing or adjusting the focus on cable input 253. For example, the combination of the parabolic reflector of lamp 214, which produces a substantially collimated beam of illumination 215, and input lens 220A, 220B may be replaced by a lamp that has an elliptical reflector, which produces a focused beam of illumination, in which case lamp 214 would be translated with respect to cable input 253. Furthermore, in all embodiments, cable input 253 itself may equivalently be translatable, or any combination of lamp, input lens, and input of fiber optic cable may be translatable.

Further referring to FIG. 7, fiber optic cable 252 guides the illumination to dual cable outputs 254A and 254B which aim lines of delivered illumination 255 at convex toric reflectors 256A, 256B, which in turn direct the illumination, in a desired manner, to platen 258 on which target 235 is situated. The target returns image light 261 which fold mirror 260 directs toward a diopter lens 262, through image filter 263, to zoom lens 266, and finally to camera 268. The zoom lens is adjustable as indicated by arrow 267 by mechanical coupling through a belt 272 to a pulley 270 when the pulley is mechanically rotated by motor 274. A communication and computer control system 280 communicates with and controls the camera 268, and motors 274 and 276, and provides image data to a display device 282, via cables 290A, B, C, and D, respectively. An image 284A, 284B, 284C, 284D, 284E or 284F is displayed on display device 282. The adjustment of the focus of input lens 220A, 220B may include adjustment corresponding to the size of the target of illumination 235, or may be adjusted corresponding to the magnification factor of zoom lens 266 that images the target of illumination, or both.

FIGS. 8A-8N and 8P show perspective and detailed views of optical ray tracing simulations based on an embodiment like that shown in FIGS. 6A, 6B; and 7. As shown in FIGS. 8A, 8F and 8K, a 25 mm diameter beam of light 215 is focused by input lens 220A of variable condenser 251 into respective light paths 224A of FIG. 8B, 224B of FIG. 8G, or 224C of FIG. 8L toward cable input 253 of cable 252. Lens 220A, shown by example as a relatively long focal length lens, may be a symmetric convex lens having focal length 101.6 mm, diameter 38.1 mm, and may be made of BK7 glass. Such a lens is commercially available, for example JML Optical Industries part number CBX10696. Lens 220A may alternatively be any suitable lens or combination of lenses, for example an achromatic doublet may be employed in situations where it is desired to minimize chromatic aberrations to maintain substantially the same illumination pattern for different wavelengths of illumination. The adjusted distances between the mid-plane of example lens 220A and cable input 253 are shown by example to be 62.0 mm, 76.3 mm, and 88.6 mm, in FIGS. 8B, 8G, and 8L, respectively. Since these distances are less the focal length of lens 220A, increasing the distance causes r, the fraction of the fiber optic cable circle input radius that has incident illumination, to be decreased. Alternatively the distances may be greater than the focal length of the lens so that increasing the distance causes r, the fraction of the fiber optic cable circle input radius that has incident illumination, to be increased. Optical simulations of the illumination spots 226A, 226B, and 226C at the fiber optic cable input, corresponding to distances 62.0 mm, 76.3 mm, and 88.6 mm, respectively, are included in FIGS. 8C, 8H and 8M, respectively, wherein the decrease of r can be observed. Cable 252 guides the illumination to dual cable outputs 254A and 254B which aim lines of delivered illumination 255 at convex toric reflectors 256A, 256B, which in turn direct the illumination, in a desired manner, to platen 258. Optical simulations of illumination delivered to the platen 258 corresponding to distances 62.0 mm, 76.3 mm, and 88.6 mm are included in FIGS. 8A, 8F, and 8K, respectively, wherein the concentration of the illumination pattern due to decrease in l, the fraction of the fiber optic cable line output that delivers the illumination, can be observed. The fields of view 283A, 283B and 283C provided by the zoom lens, which are by example 200 mm×200 mm, 100 mm×100 mm, and 50 mm×50 mm, respectively, are shown overlaid on the optical simulations of the illumination delivered to platen 258 in FIGS. 8D, 8I, and 8N, respectively. The images 284A, 284B, and 284C of fields of view 283A, 283B, and 283C, respectively, assuming a uniform space-filling target for the purpose of direct comparison, are also shown in FIGS. 8E, 8J, and 8P, respectively.

Figure 9:
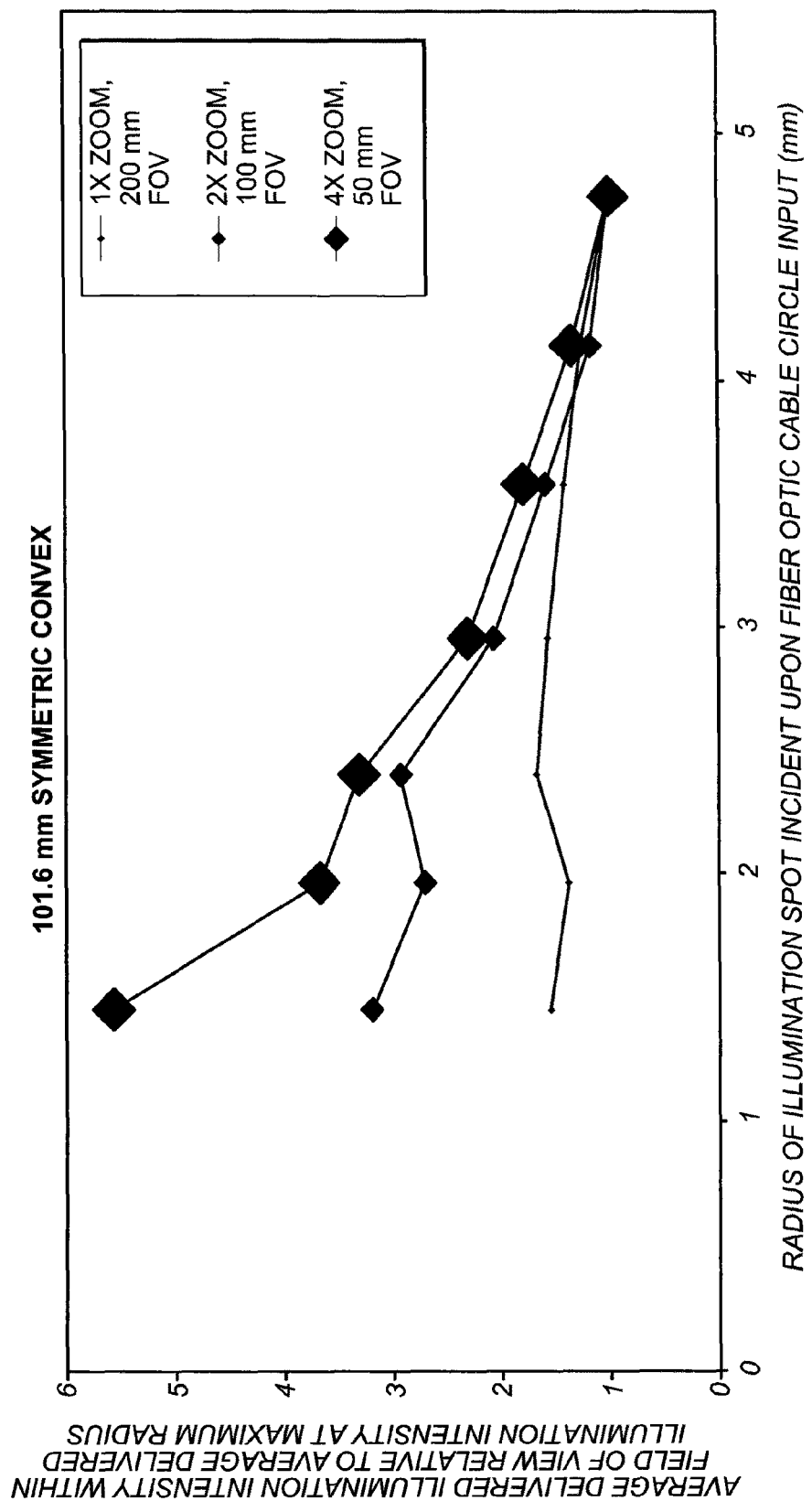
FIG. 9 shows a graph summarizing the optical ray tracing simulation shown in FIGS. 8A-8P.

FIG. 9 shows a graph summarizing the optical ray tracing simulation shown in FIGS. 8A-8N and 8P, including data obtained from additional optical ray tracing simulations. The graph shows that the average delivered illumination intensity within each field of view (FOV) relative to the average delivered illumination intensity at the maximum radius generally increases with decreasing radius of the illumination spot incident upon the fiber optic cable circle input, and generally increases faster with decreasing field of view, thus indicating the benefit of the variable condenser as far as adjustably concentrating the illumination into the smaller fields of view.

FIGS. 10A-10N and 10P show other perspective and detailed views of optical ray tracing simulations based on an embodiment like that shown in FIGS. 6A, 6B; and 7. As shown in FIGS. 10A, 10F and 10K, a 25 mm diameter beam of light 215 is focused by input lens 220B of variable condenser 251 into respective light path 224D of FIG. 10B, 224E of FIGS. 10G and 224F of FIG. 10L toward cable input 253 of fiber optic cable 252. Lens 220B, shown by example as a relatively short focal length lens, may be a symmetric convex lens having focal length 38.1 mm, diameter 38.1 mm, and may be made of BK7 glass. Such a lens is commercially available, for example Melles Griot part number 01 LDX 079. Lens 220B may alternatively be any suitable lens or combination of lenses, for example an achromatic doublet may be employed in situations where it is desired to minimize chromatic aberrations to maintain substantially the same illumination pattern for different wavelengths of illumination. The adjusted distances between the mid-plane of example lens 220B and cable input 253 are shown by example to be 21.4 mm, 26.1 mm, and 30.7 mm, in FIGS. 10B, 10G, and 10L, respectively. Since these distances are less the focal length of lens 220B, increasing the distance causes r, the fraction of the fiber optic cable circle input radius that has incident illumination, to be decreased. Alternatively the distances may be greater than the focal length of the lens so that increasing the distance causes r, the fraction of the fiber optic cable circle input radius that has incident illumination, to be increased. Optical simulations of the illumination spots 226D, 226E, and 226F at the fiber optic cable input, corresponding to distances 21.4 mm, 26.1 mm, and 30.7 mm, respectively, are included in FIGS. 10C, 10H and 10M, respectively, wherein the decrease of r can be observed. Cable 252 guides the illumination to dual cable outputs 254A and 254B which aim lines of delivered illumination 255 at convex toric reflectors 256A, 256B, which in turn direct the illumination, in a desired manner, to platen 258. Optical simulations of the illumination delivered to platen 258 corresponding to distances 21.4 mm, 26.1 mm, and 30.7 mm are included in FIGS. 10A, 10F, and 10K, respectively, wherein the concentration of the illumination pattern due to decrease in l, the fraction of the fiber optic cable line output that delivers the illumination, can be observed. The fields of view 283A, 283B and 283C provided by the zoom lens, which are by example 200 mm×200 mm, 100 mm×100 mm, and 50 mm×50 mm, respectively, are shown overlaid on the optical simulations of the illumination delivered to the platen 258 in FIGS. 10D, 10I, and 10N, respectively. The images 284D, 284E, and 284F of fields of view 283A, 283B, and 283C, respectively, assuming a uniform space-filling target for the purpose of direct comparison, are also shown in FIGS. 10E 10J, and 10P, respectively.

Figure 11:
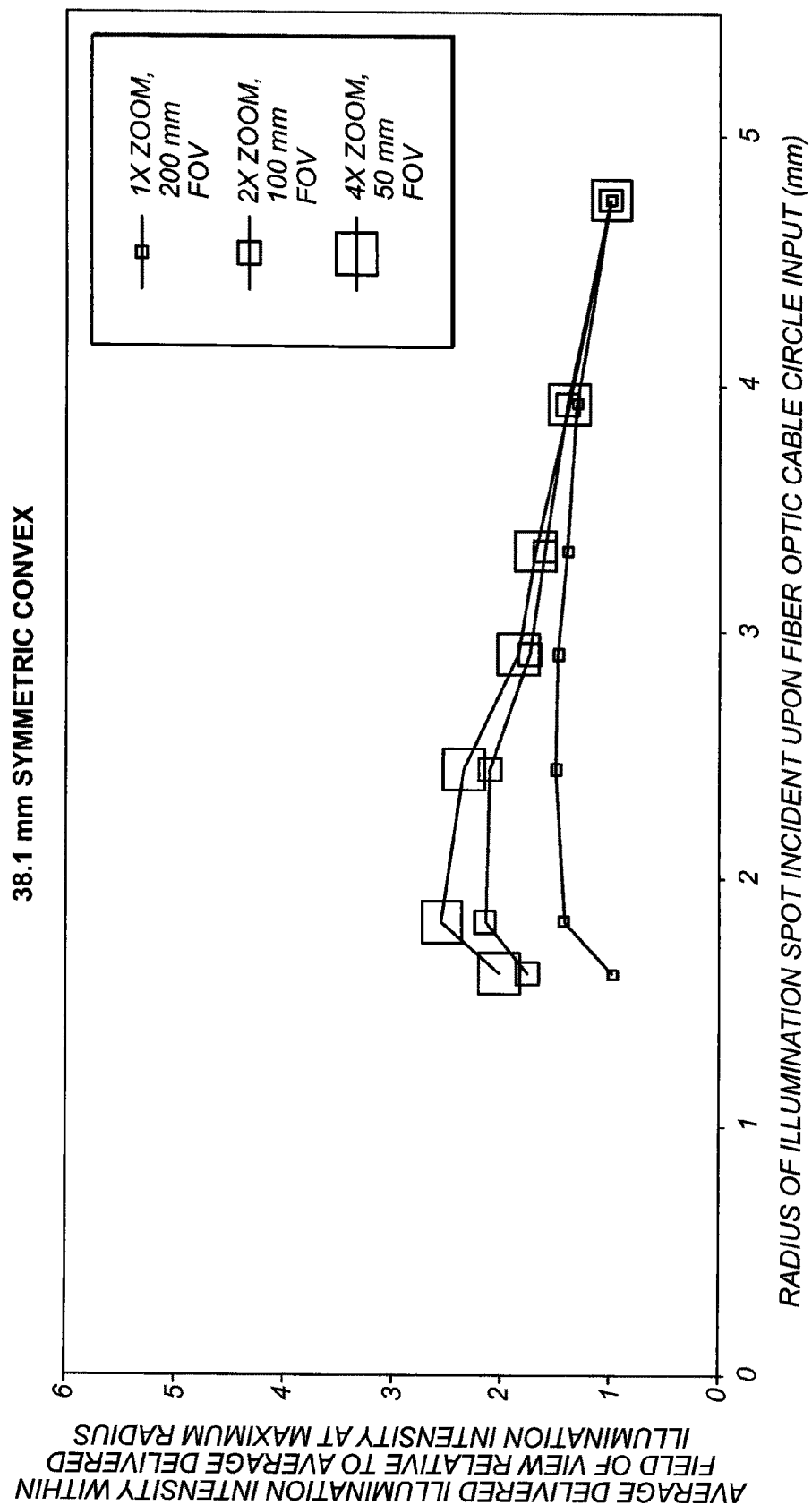
FIG. 11 shows a graph summarizing the optical ray tracing simulation shown in FIGS. 10A-10N and 10P.

FIG. 11 shows a graph summarizing the optical ray tracing simulation shown in FIGS. 10A-10N and 10P, including data obtained from additional optical ray tracing simulations. The graph shows that the average delivered illumination intensity within each field of view (FOV) relative to the average delivered illumination intensity at the maximum radius generally increases with decreasing radius of the illumination spot incident upon the fiber optic cable circle input, and generally increases faster with decreasing field of view, thus indicating the benefit of the variable condenser as far as adjustably concentrating the illumination into the smaller fields of view.

Figure 12:
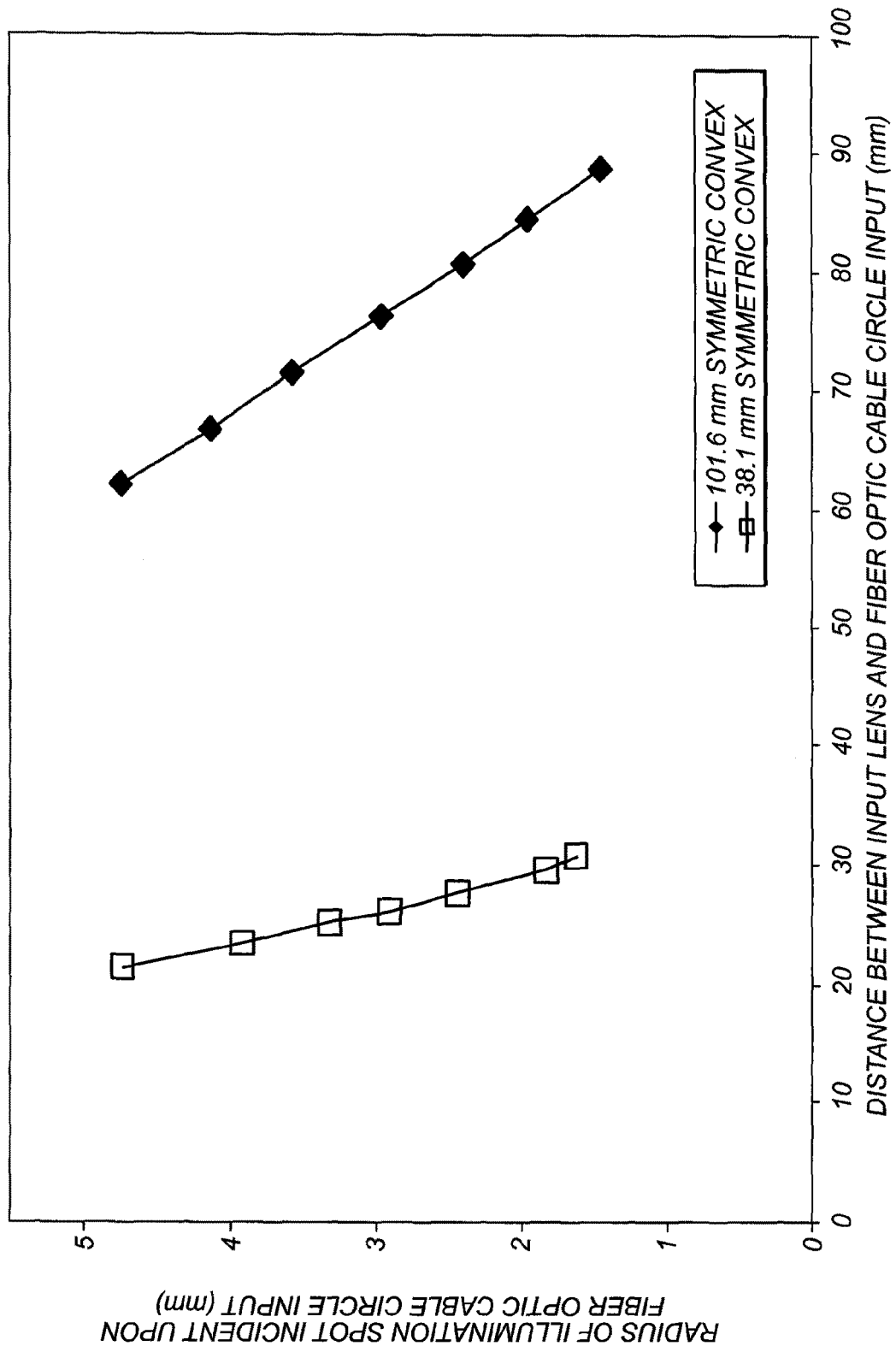
FIG. 12 shows a graph depicting the relationship between the radius of the illumination spot incident upon the fiber optic cable circle input and the distance between input lens and fiber optic cable circle input for the embodiments modeled in FIGS. 8A-8N and 8P and 10A-10N and 10P.

FIG. 12 shows a graph depicting the relationship between the radius of the illumination spot incident upon the fiber optic cable circle input and the distance between input lens and fiber optic cable circle input for the embodiments modeled in FIGS. 8A-8N and 8P and 10A-10N and 10P. The relationship between the radius of the illumination spot incident upon the fiber optic cable circle input and the distance between input lens and fiber optic cable circle input is generally a relationship of negative linear correlation due to the fact that the fiber optic cable circle input is essentially acting as a plane providing a circular conic section of the input light paths 224A, 224B, 224C, 224D, 224E, and 224F. The slope of the linear correlation for the 38.1 mm focal length lens is greater in magnitude than the slope of the linear correlation for the 101.6 mm focal length lens because the focal length of the 38.1 mm focal length lens is less than the focal length of the 101.6 mm focal length lens, hence the 38.1 mm focal length lens provides an incident cone with greater angle. In fact, the incident angles of the illumination coupled into the fiber optic input annuli are apportioned among the illuminated nesting levels, so that as the number of illuminated nesting levels is decreased, the apportionment is more coarse and hence each nesting level is illuminated on average with increasingly larger incident angles. Because the angles of illumination transmitted by the individual optical fibers at the output are substantially equal to the angles of incidence upon the individual optical fibers, the delivered illumination pattern is affected by the apportionment of the incident angles of the illumination coupled into the fiber optic input annuli. Therefore, greater concentration of the delivered illumination into smaller fields of view may be achieved by using an input lens with a longer focal length as shown by comparison of FIG. 8N with FIG. 10N, whereas greater uniformity of the delivered illumination into larger fields of view may be achieved by using an input lens with a shorter focal length as shown by comparison of FIG. 8D with FIG. 10D; the optimal illumination patterns for a range of fields of view can be achieved by optimal selection of the input lens, the fiber optic cable, and the optical elements between the output of the cable and the target. Furthermore, the optical fibers have a limited cone of acceptance of the incident input angles due to the critical angle for total internal reflection in the optical fibers, so only incident angles below the limit are transmitted.

Figure 13:
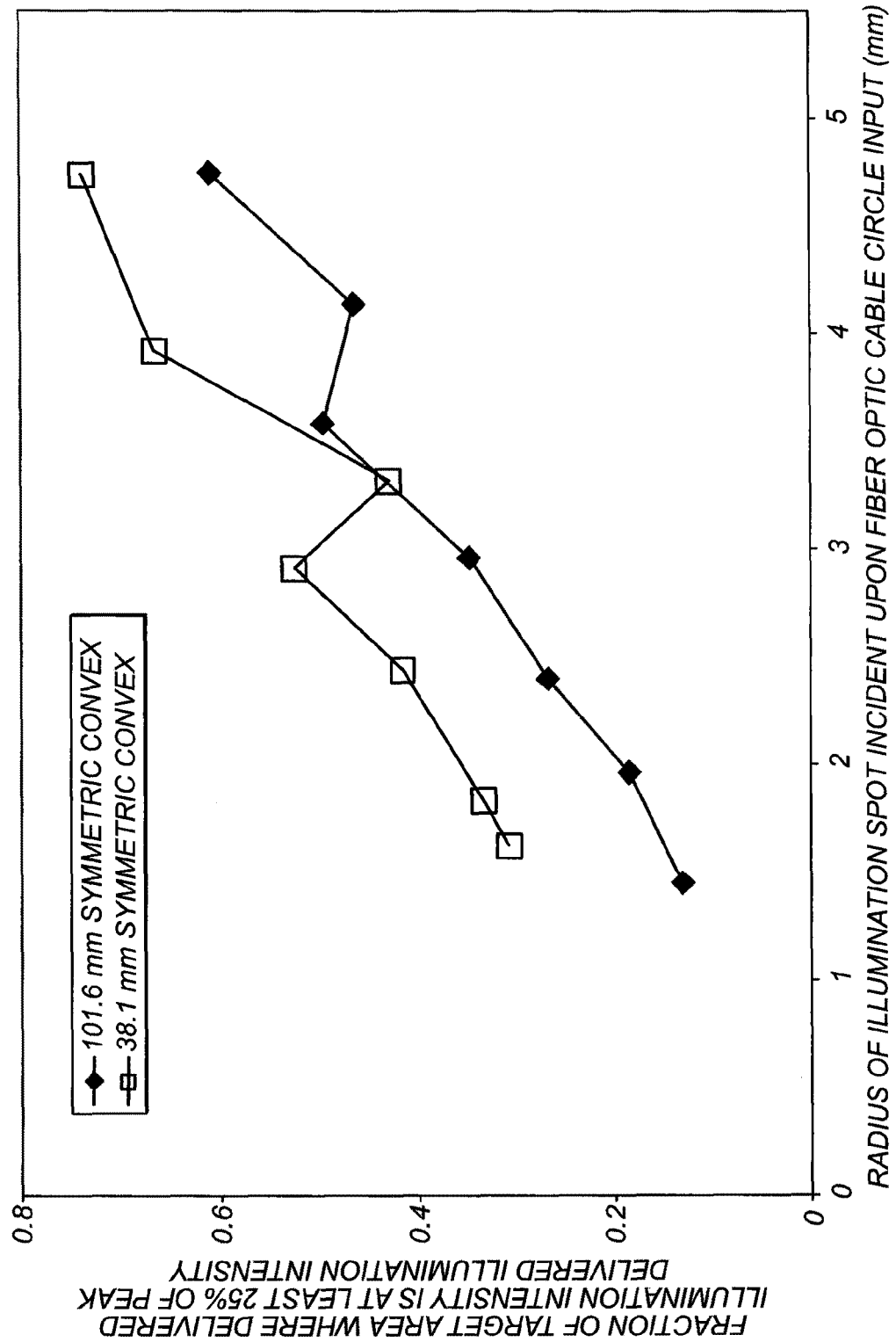
FIG. 13 shows a graph depicting the relationship between the fraction of the target area where the delivered illumination intensity is at least 25% of the peak delivered illumination intensity and the radius of the illumination spot incident upon the fiber optic cable circle input for the embodiments modeled in FIGS. and 8A-8N and 8P and 10A-10N and 10P.

FIG. 13 shows a graph depicting the relationship between the fraction of the target area where the delivered illumination intensity is at least 25% of the peak delivered illumination intensity and the radius of the illumination spot incident upon the fiber optic cable circle input for the embodiments modeled in FIGS. 8A-8N and 8P and 10A-10N and 10P. The figure of merit of 25% of the peak delivered illumination intensity was chosen as a reasonable figure of merit for useful illumination intensity. The relationship between the fraction of the target area where the delivered illumination intensity is at least 25% of the peak delivered illumination intensity and the radius of the illumination spot incident upon the fiber optic cable circle input is generally a relationship of positive linear correlation. The slope of the linear correlation for the 38.1 mm focal length lens is substantially equal to the slope of the linear correlation for the 101.6 mm focal length lens; however the intercept of the linear correlation for the 38.1 mm focal length lens is greater than the intercept of the linear correlation for the 101.6 mm focal length lens. This difference in intercept between the two cases is because the incident angles of the illumination coupled into the fiber optic input annuli are greater for the shorter 38.1 mm focal length than for the longer 101.6 mm focal length lens, so that the angles of illumination transmitted by the individual optical fibers at the output are greater for the shorter 38.1 mm focal length than for the longer 101.6 mm focal length lens, and greater angles of illumination transmitted by the individual optical fibers at the output is equivalent to greater coverage of the field of view.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

PARTS LIST 1 individual optical fibers in a set comprising the first nesting level
2 individual optical fibers in a set comprising the second nesting level
3 individual optical fibers in a set comprising the third nesting level
4 individual optical fibers in a set comprising the fourth nesting level
5 individual optical fibers in a set comprising the fifth nesting level
6 individual optical fibers in a set comprising the sixth nesting level
7 individual optical fibers in a set comprising the seventh nesting level
8 individual optical fibers in a set comprising the eighth nesting level
10 variable condenser
12 variable condenser
100 recursively nested circle-to-line fiber optic shape-converting cable with single line cable output
105 recursively nested circle-to-line fiber optic shape-converting cable with dual line outputs
110 cable input
112 cable input
112A, 112B dual cable outputs
114 bifurcation
120 single line cable output
125A, B dual single line cable outputs
130A, B, C, D, E, F, G, H illumination input lens configurations
135 arrow indicating focus adjustment of lens configurations
140 beam of illumination light
142A, B, C, D, E, F, G, H illumination light focused by input lens
145A, B, C, D, E, F, G, H spots of illumination light incident upon cable input
150A, B, C, D, E, F, G, H illumination light delivered from cable output
155A, B, C, D, E, F, G, H relative lengths of delivered illumination light along line direction
160 cylindrical lens
170A, D, H slits of illumination light
200 imaging system
210 illumination source module
212 illumination source
214 lamp
215 beam of illumination light
216 illumination filter wheel
217 illumination filter
220A, B illumination input lenses
222 arrow indicating movement of 220A, 22B to adjust focus
224A, B, C, D, E, F illumination light focused by input lens
226A, B, C, D, E, F illumination spot at fiber optic cable input
230 sample chamber
235 target of illumination
250 image capture module
251 variable condenser
252 recursively nested circle-to-line fiber optic shape-converting cable with dual line outputs
253 cable input
254A, B dual cable outputs
255 illumination light delivered from cable output
256A, B illumination path convex toric mirrors
258 platen
260 image path fold mirror
261 image light
262 image path diopter lens
263 image path filter
264 image filter wheel
266 image path zoom lens
267 arrow indicating adjustability of zoom lens 266
268 camera
270 pulley
272 belt
274 motor
276 motor
278 lead screw
279 lens mount
280 communication and computer control system
282 display device
283A, B, C fields of view provided by zoom lens
284A, B, C, D, E, F images
285A, B, C, D cables

What is claimed is:

1. A variable condenser apparatus for delivery of illumination from an illumination source, the apparatus comprising:
a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli define input nesting levels of the individual optical fibers, the sets of individual optical fibers at the cable output being recursively nested in at least one line about an output common center and are arranged to form pairs of line segments at output nesting levels about the output common center, the output nesting levels corresponding to the input nesting levels; and
means for adjusting a focus of illumination on the cable input.

2. The apparatus of claim 1, wherein the cable has a plurality of cable outputs; and
at each of the plurality of cable outputs, the sets of individual optical fibers are recursively nested in at least one line about an output common center and are arranged to form pairs of line segments at output nesting levels about the output common center.

3. A slit lamp apparatus, comprising:
a source of illumination;
a variable condenser apparatus for delivery of illumination from the source, the condenser apparatus including:
(1) a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli define input nesting levels of the optical fibers, the sets of individual optical fibers at the cable output being recursively nested in at least one line about an output common center and are arranged to form pairs of line segments at output nesting levels about the output common center, the output nesting levels having a correspondence to the input nesting levels; and
(2), means for adjusting a focus of illumination on the cable input; and
a cylindrical lens for receiving illumination from the cable output.

4. An imaging system, comprising:
a source of illumination;
a variable condenser apparatus for delivery of illumination from the source, the condenser apparatus including:
(1) a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli define input nesting levels of the optical fibers, the sets of individual optical fibers at the cable output being recursively nested in at least one line about an output common center and are arranged to form pairs of line segments at output nesting levels about the output common center, the output nesting levels having a correspondence to the input nesting levels; and
(2) means for adjusting a focus of illumination on the cable input;
a platen for supporting a target to be illuminated by illumination delivered from the cable output; and
means for imaging an illuminated target.

5. The imaging system of claim 4, further comprising at least one mirror to distribute the delivered illumination in a desired manner to the platen.

6. The imaging system of claim 5 wherein the at least one mirror is curved.

7. The imaging system of claim 6 wherein the at least one mirror has a convex toric curvature.

8. The imaging system of claim 4 wherein the means for imaging includes a zoom lens.

9. A variable condenser apparatus for delivery of illumination from an illumination source, comprising:
a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli defining input nesting levels of the optical fibers; and
means for adjusting a focus of illumination on the cable input comprising a lens system that varies a radius of an illumination spot incident upon the cable input, thereby varying the number of input nesting levels that deliver illumination.

10. The apparatus of claim 9, wherein the radius of the illumination spot corresponds to a size of a target to be illuminated by illumination delivered from the cable output.

11. The apparatus of claim 9, wherein the radius of the illumination spot corresponds to a magnification factor of a zoom lens that images a target to be illuminated by illumination delivered from the cable output.

12. A slit lamp apparatus, comprising:
a source of illumination;
a variable condenser apparatus for delivery of illumination from the source, the condenser apparatus including:
(1) a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli defining input nesting levels of the optical fibers; and
(2) means for adjusting a focus of illumination on the cable input comprising a lens system that varies a radius of an illumination spot incident upon the cable input, thereby varying the number of input nesting levels that deliver illumination; and
a cylindrical lens for receiving illumination from the cable output.

13. An imaging system comprising:
a source of illumination;
a variable condenser apparatus for delivery of illumination from the source, the condenser apparatus including:
(1) a circle-to-line, fiber optic, shape-converting cable having a cable input for receiving illumination and a cable output for delivering illumination, the cable including recursively nested sets of individual optical fibers, the sets of individual optical fibers at the cable input being recursively nested in successively smaller annuli about an input common center and the annuli defining input nesting levels of the optical fibers; and
(2) means for adjusting a focus of illumination on the cable input comprising a lens system that varies a radius of an illumination spot incident upon the cable input, thereby varying the number of input nesting levels that deliver illumination;
a platen for supporting a target to be illuminated by illumination delivered from the cable output;
means for imaging an illuminated target wherein the means for imaging includes a zoom lens; and
the radius of the illumination spot corresponds to a magnification factor of the zoom lens.

14. The apparatus of claim 13, wherein at the cable output, the sets of individual optical fibers are recursively nested in at least one line about an output common center.

15. The apparatus of claim 14, wherein
the sets of individual optical fibers at the cable output are arranged to form pairs of line segments at output nesting levels about the output common center; and
the output nesting levels have a correspondence to the input nesting levels.

16. The apparatus of claim 13, wherein the radius of the illumination spot corresponds to a size of a target supported on the platen.

* * * * *